(12) United States Patent
Lin et al.

(10) Patent No.: US 9,584,025 B2
(45) Date of Patent: *Feb. 28, 2017

(54) SYSTEMS AND METHODS FOR FLYBACK POWER CONVERTERS WITH SWITCHING FREQUENCY AND PEAK CURRENT ADJUSTMENTS BASED ON CHANGES IN FEEDBACK SIGNALS

(71) Applicant: ON-BRIGHT ELECTRONICS (SHANGHAI) CO., LTD., Shanghai (CN)

(72) Inventors: Yuan Lin, Shanghai (CN); Zhenglan Xia, Shanghai (CN); Xiuhong Zhang, Shanghai (CN); Lieyi Fang, Shanghai (CN)

(73) Assignee: On-Bright Electronics (Shanghai) Co., Ltd., Shanghai (CN)

(*) Notice: Subject to any disclaimer, the term of this patent is extended or adjusted under 35 U.S.C. 154(b) by 33 days.

This patent is subject to a terminal disclaimer.

(21) Appl. No.: 14/488,176

(22) Filed: Sep. 16, 2014

(65) Prior Publication Data

US 2015/0055378 A1  Feb. 26, 2015

Related U.S. Application Data

(63) Continuation of application No. 13/215,028, filed on Aug. 22, 2011, now Pat. No. 8,879,289.

(30) Foreign Application Priority Data

Aug. 4, 2011  (CN) .......................... 2011 1 0224933

(51) Int. Cl.
*H02M 3/335* (2006.01)
*H02M 1/00* (2006.01)

(52) U.S. Cl.
CPC ............... *H02M 3/33507* (2013.01); *H02M 2001/0032* (2013.01); *Y02B 70/16* (2013.01)

(58) Field of Classification Search
CPC ................................................ H02M 3/33507
(Continued)

(56) References Cited

U.S. PATENT DOCUMENTS 3,912,340 A   10/1975   Bertolasi
5,247,241 A   9/1993   Ueda
(Continued)

FOREIGN PATENT DOCUMENTS

CN  1841893 A   10/2006
CN  1917322 A   2/2007
(Continued)

OTHER PUBLICATIONS

Chinese Patent Office, Office Action mailed Jun. 4, 2014, in Application No. 201110144768.2.
(Continued)

*Primary Examiner* — Jeffrey Sterrett
(74) *Attorney, Agent, or Firm* — Jones Day

(57) ABSTRACT

System and method for regulating a power converter. The system includes a first comparator configured to receive a first input signal and a second input signal and generate a first comparison signal based on at least information associated with the first input signal and the second input signal, a pulse-width-modulation generator configured to receive at least the first comparison signal and generate a modulation signal based on at least information associated with the first comparison signal, a driver component configured to receive the modulation signal and output a drive signal to a switch to adjust a primary current flowing through a primary winding of the power converter, and a voltage-change-rate detection component configured to sample the feedback
(Continued)

signal to generate a first sampled signal for a first modulation period and to sample the feedback signal to generate a second sampled signal for a second modulation period.

25 Claims, 17 Drawing Sheets

(58) Field of Classification Search
USPC .................. 363/21.1, 21.11, 21.18, 41, 97
See application file for complete search history.

(56) References Cited

U.S. PATENT DOCUMENTS

| | | | |
|---|---|---|---|
| 5,497,119 A | 3/1996 | Tedrow et al. |
| 5,568,044 A | 10/1996 | Bittner |
| 5,729,448 A | 3/1998 | Haynie et al. |
| 6,134,060 A | 10/2000 | Ryat |
| 6,292,376 B1 | 9/2001 | Kato |
| 6,366,070 B1 | 4/2002 | Cooke et al. |
| 6,381,151 B1 | 4/2002 | Jang |
| 6,545,513 B2 | 4/2003 | Tsuchida et al. |
| 6,556,478 B2 | 4/2003 | Willis et al. |
| 6,713,995 B2 | 3/2004 | Chen |
| 6,798,086 B2 | 9/2004 | Utsunomiya |
| 6,947,298 B2 | 9/2005 | Uchida |
| 6,954,056 B2 | 10/2005 | Hoshino et al. |
| 6,972,528 B2 | 12/2005 | Shao |
| 6,972,548 B2 | 12/2005 | Tzeng et al. |
| 6,977,824 B1 | 12/2005 | Yang et al. |
| 7,035,119 B2 | 4/2006 | Koike |
| 7,054,169 B2 | 5/2006 | Huh et al. |
| 7,116,089 B1 | 10/2006 | Nguyen et al. |
| 7,173,404 B2 | 2/2007 | Wu |
| 7,208,927 B1 | 4/2007 | Nguyen |
| 7,262,587 B2 | 8/2007 | Takimoto et al. |
| 7,265,999 B2 | 9/2007 | Murata et al. |
| 7,310,247 B1 | 12/2007 | Lin et al. |
| 7,345,895 B2 | 3/2008 | Zhu et al. |
| 7,394,634 B2 | 7/2008 | Fang et al. |
| 7,414,865 B2 | 8/2008 | Yang |
| 7,456,623 B2 | 11/2008 | Hasegawa et al. |
| 7,492,619 B2 | 2/2009 | Ye et al. |
| 7,522,431 B2 | 4/2009 | Huynh et al. |
| 7,605,576 B2 | 10/2009 | Kanakubo |
| 7,609,039 B2 | 10/2009 | Hasegawa |
| 7,684,220 B2 | 3/2010 | Fang et al. |
| 7,684,462 B2 | 3/2010 | Ye et al. |
| 7,826,237 B2 | 11/2010 | Zhang et al. |
| 7,852,055 B2 | 12/2010 | Michishita |
| 7,898,825 B2 | 3/2011 | Mulligan et al. |
| 7,952,895 B2 | 5/2011 | Matthews |
| 7,990,202 B2 | 8/2011 | Fang et al. |
| 8,085,027 B2 | 12/2011 | Lin et al. |
| 8,213,203 B2 | 7/2012 | Fei et al. |
| 8,305,776 B2 | 11/2012 | Fang |
| 8,331,112 B2 | 12/2012 | Huang et al. |
| 8,339,814 B2 | 12/2012 | Zhang et al. |
| 8,391,028 B2 | 3/2013 | Yeh |
| 8,488,342 B2 | 7/2013 | Zhang et al. |
| 8,526,203 B2 | 9/2013 | Huang et al. |
| 8,630,103 B2 | 1/2014 | Baurle et al. |
| 8,693,217 B2 | 4/2014 | Mao |
| 8,879,289 B2 | 11/2014 | Lin et al. |
| 8,891,256 B2 | 11/2014 | Fang et al. |
| 8,971,062 B2 | 3/2015 | Huang et al. |
| 8,982,585 B2 | 3/2015 | Fang |
| 9,154,038 B2 | 10/2015 | Fang et al. |
| 2002/0080625 A1 | 6/2002 | Goyhenetche et al. |
| 2002/0080631 A1 | 6/2002 | Kanouda et al. |
| 2003/0174520 A1 | 9/2003 | Bimbaud |
| 2004/0075600 A1 | 4/2004 | Vera et al. |
| 2005/0057238 A1 | 3/2005 | Yoshida |
| 2005/0116697 A1 | 6/2005 | Matsuo et al. |
| 2005/0222646 A1 | 10/2005 | Kroll et al. |
| 2005/0270807 A1 | 12/2005 | Strijker |
| 2006/0034102 A1 | 2/2006 | Yang et al. |
| 2006/0043953 A1 | 3/2006 | Xu |
| 2006/0050539 A1 | 3/2006 | Yang et al. |
| 2006/0055433 A1 | 3/2006 | Yang et al. |
| 2006/0273772 A1 | 12/2006 | Groom |
| 2007/0115696 A1 | 5/2007 | Berghegger |
| 2007/0171687 A1 | 7/2007 | Kogel et al. |
| 2007/0241733 A1 | 10/2007 | Chen et al. |
| 2007/0273345 A1 | 11/2007 | Chen et al. |
| 2008/0031015 A1 | 2/2008 | Na et al. |
| 2008/0061754 A1 | 3/2008 | Hibi |
| 2008/0112193 A1 | 5/2008 | Yan et al. |
| 2008/0130324 A1 | 6/2008 | Choi et al. |
| 2008/0157742 A1 | 7/2008 | Martin et al. |
| 2008/0159378 A1 | 7/2008 | Kris |
| 2008/0225563 A1 | 9/2008 | Seo |
| 2008/0252345 A1 | 10/2008 | Deschamp et al. |
| 2008/0278225 A1 | 11/2008 | Hu et al. |
| 2009/0051336 A1 | 2/2009 | Hartlieb et al. |
| 2009/0058387 A1 | 3/2009 | Huynh et al. |
| 2009/0073727 A1 | 3/2009 | Huynh et al. |
| 2009/0091955 A1 | 4/2009 | Choi et al. |
| 2009/0121697 A1 | 5/2009 | Aiura et al. |
| 2009/0141520 A1 | 6/2009 | Grande et al. |
| 2009/0175057 A1 | 7/2009 | Grande et al. |
| 2009/0206814 A1 | 8/2009 | Zhang et al. |
| 2009/0302817 A1 | 12/2009 | Nagai |
| 2010/0061126 A1 | 3/2010 | Huynh et al. |
| 2010/0128501 A1 | 5/2010 | Huang et al. |
| 2010/0141178 A1 | 6/2010 | Negrete et al. |
| 2010/0195355 A1 | 8/2010 | Zheng |
| 2010/0219802 A1 | 9/2010 | Lin et al. |
| 2010/0225293 A1 | 9/2010 | Wang et al. |
| 2010/0296318 A1 | 11/2010 | Teo |
| 2011/0044076 A1 | 2/2011 | Zhang et al. |
| 2011/0149614 A1 | 6/2011 | Stracquadaini |
| 2011/0182089 A1 | 7/2011 | genannt Berghegger |
| 2011/0248770 A1 | 10/2011 | Fang et al. |
| 2011/0267853 A1 | 11/2011 | Yang et al. |
| 2012/0013321 A1 | 1/2012 | Huang et al. |
| 2012/0075891 A1 | 3/2012 | Zhang et al. |
| 2012/0139435 A1 | 6/2012 | Storm |
| 2012/0147630 A1 | 6/2012 | Cao et al. |
| 2012/0153919 A1 | 6/2012 | Garbossa et al. |
| 2012/0195076 A1 | 8/2012 | Zhang et al. |
| 2012/0224397 A1 | 9/2012 | Yeh |
| 2012/0257423 A1 | 10/2012 | Fang |
| 2012/0281438 A1 | 11/2012 | Fang et al. |
| 2012/0300508 A1 | 11/2012 | Fang |
| 2013/0003421 A1 | 1/2013 | Fang |
| 2013/0027989 A1 | 1/2013 | Fang |
| 2013/0033905 A1 | 2/2013 | Lin et al. |
| 2013/0051090 A1 | 2/2013 | Xie et al. |
| 2013/0182476 A1 | 7/2013 | Yang et al. |
| 2013/0223107 A1 | 8/2013 | Zhang et al. |
| 2013/0272033 A1 | 10/2013 | Zhang et al. |
| 2013/0308350 A1 | 11/2013 | Huang et al. |
| 2014/0078790 A1 | 3/2014 | Lin et al. |
| 2014/0160809 A1 | 6/2014 | Lin et al. |
| 2014/0218978 A1 | 8/2014 | Heuken et al. |
| 2014/0268920 A1 | 9/2014 | Fang et al. |
| 2015/0055378 A1 | 2/2015 | Lin et al. |
| 2015/0062981 A1 | 3/2015 | Fang et al. |
| 2015/0162820 A1 | 6/2015 | Zhang et al. |
| 2015/0295499 A1 | 10/2015 | Zhang et al. |
| 2015/0311804 A1 | 10/2015 | Fang |
| 2016/0028318 A1 | 1/2016 | Fang et al. |
| 2016/0043649 A1 | 2/2016 | Fang et al. |

FOREIGN PATENT DOCUMENTS

| | | |
|---|---|---|
| CN | 1929274 A | 3/2007 |
| CN | 1964172 A | 5/2007 |
| CN | 1988347 A | 6/2007 |
| CN | 101034851 A | 9/2007 |
| CN | 101039077 A | 9/2007 |
| CN | 101079576 A | 11/2007 |
| CN | 101127495 A | 2/2008 |
| CN | 101247083 A | 8/2008 |

(56) References Cited

FOREIGN PATENT DOCUMENTS

| | | |
|---|---|---|
| CN | 101295872 A | 10/2008 |
| CN | 101350562 A | 1/2009 |
| CN | 101515756 A | 8/2009 |
| CN | 101552560 A | 10/2009 |
| CN | 101577468 A | 11/2009 |
| CN | 101577488 A | 11/2009 |
| CN | 101826796 A | 9/2010 |
| CN | 102185484 A | 9/2011 |
| CN | 101515756 B | 11/2011 |
| CN | 102332826 A | 1/2012 |
| CN | 102474964 A | 5/2012 |
| CN | 102624237 A | 8/2012 |
| CN | 102651613 A | 8/2012 |
| CN | 102709880 A | 10/2012 |
| CN | 102723945 A | 10/2012 |
| CN | 102983760 A | 3/2013 |
| CN | 103166198 A | 6/2013 |
| CN | 103296904 A | 9/2013 |
| TW | 200840174 A | 10/2008 |
| TW | 200937157 A | 9/2009 |
| TW | 201234754 | 8/2012 |
| TW | 201238224 | 9/2012 |
| TW | I 437808 | 5/2014 |
| TW | I 448060 | 8/2014 |

OTHER PUBLICATIONS

Chinese Patent Office, Office Action mailed Dec. 8, 2014, in Application No. 201110034669.9.
Chinese Patent Office, Office Action mailed Nov. 12, 2013, in Application No. 201110051423.2.
Chinese Patent Office, Office Action mailed Nov. 14, 2013, in Application No. 201110224933.5.
Chinese Patent Office, Office Action mailed Nov. 5, 2013, in Application No. 201210529679.4.
Chinese Patent Office, Office Action mailed Nov. 5, 2013, in Application No. 201310078547.9.
Chinese Patent Office, Office Action mailed Nov. 7, 2013, in Application No. 201210342097.5.
Taiwan Patent Office, Office Action mailed Mar. 3, 2014, in Application No. 100127088.
Taiwan Patent Office, Office Action mailed Oct. 6, 2014, in Application No. 102115002.
Taiwan Patent Office, Office Action mailed Oct. 1, 2014, in Application No. 102116551.
United States Patent and Trademark Office, Notice of Allowance mailed Jan. 16, 2014, in U.S. Appl. No. 13/215,028.
United States Patent and Trademark Office, Notice of Allowance mailed Jul. 30, 2014, in U.S. Appl. No. 12/859,138.
United States Patent and Trademark Office, Notice of Allowance mailed Sep. 18, 2014, in U.S. Appl. No. 13/946,917.
United States Patent and Trademark Office, Notice of Allowance mailed Oct. 23, 2014, in U.S. Appl. No. 13/646,239.
United States Patent and Trademark Office, Notice of Allowance mailed Jul. 7, 2014, in U.S. Appl. No. 13/164,608.
United States Patent and Trademark Office, Notice of Allowance mailed Jun. 25, 2014, in U.S. Appl. No. 13/215,028.
United States Patent and Trademark Office, Notice of Allowance mailed Mar. 18, 2014, in U.S. Appl. No. 13/215,028.
United States Patent and Trademark Office, Notice of Allowance mailed Mar. 7, 2014, in U.S. Appl. No. 13/164,608.
United States Patent and Trademark Office, Notice of Allowance mailed Nov. 25, 2013, in U.S. Appl. No. 13/164,608.
United States Patent and Trademark Office, Office Action mailed Apr. 1, 2014, in U.S. Appl. No. 13/052,869.
United States Patent and Trademark Office, Office Action mailed Nov. 5, 2014, in U.S. Appl. No. 13/052,869.
United States Patent and Trademark Office, Office Action mailed Apr. 1, 2014, in U.S. Appl. No. 13/646,239.
United States Patent and Trademark Office, Office Action mailed Aug. 27, 2013, in U.S. Appl. No. 13/646,239.
United States Patent and Trademark Office, Office Action mailed Dec. 5, 2012, in U.S. Appl. No. 12/859,138.
United States Patent and Trademark Office, Office Action mailed Feb. 15, 2013, in U.S. Appl. No. 13/052,869.
United States Patent and Trademark Office, Office Action mailed Jul. 31, 2013, in U.S. Appl. No. 12/859,138.
United States Patent and Trademark Office, Office Action mailed Oct. 1, 2013, in U.S. Appl. No. 13/052,869.
Chinese Patent Office, Office Action mailed Dec. 4, 2015, in Application No. 201410226277.6.
Chinese Patent Office, Office Action mailed Nov. 25, 2015, in Application No. 201310656906.4.
United States Patent and Trademark Office, Notice of Allowance mailed Nov. 16, 2015, in U.S. Appl. No. 14/151,209.
United States Patent and Trademark Office, Notice of Allowance mailed Jan. 8, 2016, in U.S. Appl. No. 13/052,869.
United States Patent and Trademark Office, Notice of Allowance mailed Feb. 1, 2016, in U.S. Appl. No. 13/722,788.
United States Patent and Trademark Office, Notice of Allowance mailed Feb. 10, 2016, in U.S. Appl. No. 13/857,836.
United States Patent and Trademark Office, Notice of Allowance mailed Feb. 22, 2016, in U.S. Appl. No. 13/915,477.
United States Patent and Trademark Office, Office Action mailed Mar. 7, 2016, in U.S. Appl. No. 14/293,280.
United States Patent and Trademark Office, Notice of Allowance mailed Jan. 20, 2015, in U.S. Appl. No. 12/859,138.
United States Patent and Trademark Office, Office Action mailed Feb. 24, 2015, in U.S. Appl. No. 13/722,788.
United States Patent and Trademark Office, Office Action mailed Mar. 12, 2015, in U.S. Appl. No. 13/857,836.
United States Patent and Trademark Office, Office Action mailed Mar. 12, 2015, in U.S. Appl. No. 13/915,477.
Chinese Patent Office, Office Action mailed Mar. 31, 2015, in Application No. 201310386241.X.
Taiwan Patent Office, Office Action mailed Apr. 27, 2015, in Application No. 102138576.
Taiwan Patent Office, Office Action mailed May 6, 2015, in Application No. 102116550.
United States Patent and Trademark Office, Notice of Allowance mailed Jun. 22, 2015, in U.S. Appl. No. 13/052,869.
United States Patent and Trademark Office, Notice of Allowance mailed Aug. 7, 2015, in U.S. Appl. No. 14/151,209.
United States Patent and Trademark Office, Notice of Allowance mailed Jun. 8, 2015, in U.S. Appl. No. 14/019,373.
Taiwan Patent Office, Office Action mailed Oct. 16, 2015, in Application No. 102116550.
United States Patent and Trademark Office, Notice of Allowance mailed Oct. 2, 2015, in U.S. Appl. No. 13/052,869.
United States Patent and Trademark Office, Notice of Allowance mailed Oct. 2, 2015, in U.S. Appl. No. 13/722,788.
United States Patent and Trademark Office, Notice of Allowance mailed Oct. 5, 2015, in U.S. Appl. No. 13/915,477.
United States Patent and Trademark Office, Notice of Allowance mailed Sep. 30, 2015, in U.S. Appl. No. 13/857,836.
United States Patent and Trademark Office, Office Action mailed Aug. 20, 2015, in U.S. Appl. No. 13/646,268.
United States Patent and Trademark Office, Corrected Notice of Allowability mailed May 26, 2016, in U.S. Appl. No. 13/052,869.
United States Patent and Trademark Office, Office Action mailed May 17, 2016, in U.S. Appl. No. 13/646,268.
United States Patent and Trademark Office, Notice of Allowance mailed Apr. 21, 2016, in U.S. Appl. No. 14/684,047.
United States Patent and Trademark Office, Office Action mailed Nov. 22, 2016, in U.S. Appl. No. 13/646,268.
United States Patent and Trademark Office, Office Action mailed Aug. 24, 2016, in U.S. Appl. No. 14/830,603.
United States Patent and Trademark Office, Notice of Allowance mailed Sep. 22, 2016, in U.S. Appl. No. 14/293,280.
United States Patent and Trademark Office, Notice of Allowance mailed Oct. 21, 2016, in U.S. Appl. No. 14/684,047.

(56) References Cited

OTHER PUBLICATIONS

United States Patent and Trademark Office, Office Action mailed Nov. 2, 2016, in U.S. Appl. No. 14/824,018.
United States Patent and Trademark Office, Office Action mailed Dec. 29, 2016, in U.S. Appl. No. 15/040,674.

SYSTEMS AND METHODS FOR FLYBACK POWER CONVERTERS WITH SWITCHING FREQUENCY AND PEAK CURRENT ADJUSTMENTS BASED ON CHANGES IN FEEDBACK SIGNALS

1. CROSS-REFERENCES TO RELATED APPLICATIONS

This application is a continuation of U.S. patent application Ser. No. 13/215,028, filed Aug. 22, 2011, which claims priority to Chinese Patent Application No. 201110224933.5, filed Aug. 4, 2011, both applications being commonly assigned and incorporated by reference herein for all purposes.

Additionally, this application is related to U.S. patent application Ser. Nos. 12/859,138 and 13/052,869, commonly assigned, incorporated by reference herein for all purposes.

2. BACKGROUND OF THE INVENTION

The present invention is directed to integrated circuits. More particularly, the invention provides switching frequency and peak current adjustments in response to loading changes. Merely by way of example, the invention has been applied to a flyback power converter. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar transistor. In another example, the power switch 120 is a MOS transistor.

To regulate the output voltage within a predetermined range, information related to the output voltage and the output loading often needs to be extracted. In the power conversion system 100, such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1 + R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 114 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

But the power conversion system 100 often cannot provide effective response to output loading changes. Hence it is highly desirable to improve the techniques of primary-side sensing and regulation.

3. BRIEF SUMMARY OF THE INVENTION

The present invention is directed to integrated circuits. More particularly, the invention provides switching frequency and peak current adjustments in response to loading changes. Merely by way of example, the invention has been applied to a flyback power converter. But it would be recognized that the invention has a much broader range of applicability.

According to one embodiment, a system for regulating a power converter includes a first comparator, a pulse-width-modulation generator, a driver component, and a voltage-change-rate detection component. The first comparator is configured to receive a first input signal and a second input signal and generate a first comparison signal based on at least information associated with the first input signal and the second input signal, the first input signal being associated with at least a feedback signal related to an output current of the power converter. The pulse-width-modulation generator is configured to receive at least the first comparison signal and generate a modulation signal based on at least information associated with the first comparison signal, the modulation signal being associated with a modulation frequency. Moreover, the driver component is configured to receive the modulation signal and output a drive signal to a switch to adjust a primary current flowing through a primary winding of the power converter, the primary current being associated with a peak magnitude for each modulation period corresponding to the modulation frequency. Additionally, the voltage-change-rate detection component is configured to sample the feedback signal to generate a first sampled signal for a first modulation period and to sample the feedback signal to generate a second sampled signal for a second modulation period, the voltage-change-rate detection component being further configured to compare the first sampled signal and the second sampled signal in magnitude, the second modulation period being after the first modulation period. The system is further configured to determine whether the first sampled signal subtracted by the second sampled signal satisfies one or more first conditions. If the one or more first conditions are satisfied, the system is further configured to increase the modulation frequency and the peak magnitude related to the primary current.

According to another embodiment, a method for regulating a power converter includes receiving a first input signal and a second input signal, processing information associated with the first input signal and the second input signal, and generating a first comparison signal based on at least information associated with the first input signal and the second input signal, the first input signal being associated with at least a feedback signal related to an output current of the power converter. The method further includes receiving at least the first comparison signal, processing information associated with the first comparison signal, and generating a modulation signal based on at least information associated with the first comparison signal, the modulation signal being associated with a modulation frequency. In addition, the method includes receiving the modulation signal, processing information associated with the modulation signal, and outputting a drive signal to a switch to adjust a primary current flowing through a primary winding of the power converter, the primary current being associated with a peak magnitude for each modulation period corresponding to the modulation frequency. Moreover, the method includes sampling the feedback signal to generate a first sampled signal for a first modulation period, and sampling the feedback signal to generate a second sampled signal for a second modulation period, the second modulation period being after the first modulation period. Furthermore, the method includes determining whether the first sampled signal subtracted by the second sampled signal satisfies one or more first conditions, and if the one or more first conditions are satisfied, increasing the modulation frequency and the peak magnitude related to the primary current.

According to yet another embodiment, a system for regulating a power converter includes a first comparator, a pulse-width-modulation generator, a driver component, and a voltage-change-rate detection component. The first comparator is configured to receive a first input signal and a second input signal and generate a first comparison signal based on at least information associated with the first input signal and the second input signal, the first input signal being associated with at least a feedback signal related to an output current of the power converter. The pulse-width-modulation generator is configured to receive at least the first comparison signal and generate a modulation signal based on at least information associated with the first comparison signal, the modulation signal being associated with a modulation frequency. Moreover, the driver component is configured to receive the modulation signal and output a drive signal to a switch to adjust a primary current flowing through a primary winding of the power converter, the primary current being associated with a peak magnitude for each modulation period corresponding to the modulation frequency. In addition, the voltage-change-rate detection component is configured to sample the feedback signal to generate a first sampled signal for a first modulation period and to sample the feedback signal to generate a second sampled signal for a second modulation period, the voltage-change-rate detection component being further configured to compare the first sampled signal and the second sampled signal in magnitude, the second modulation period being after the first modulation period. The system is further configured to determine whether the first sampled signal subtracted by the second sampled signal is larger than a first threshold voltage, the first threshold voltage being larger than or equal to zero, and if the first sampled signal subtracted by the second sampled signal is determined to be larger than the first threshold voltage, increase the modulation frequency and the peak magnitude related to the primary current. Furthermore, the system is further configured to determine whether the second sampled signal subtracted by the first sampled signal is larger than a second threshold voltage, the second threshold voltage being larger than or equal to zero; and if the second sampled signal subtracted by the first sampled signal is determined to be larger than the second threshold voltage, decrease the modulation frequency and the peak magnitude related to the primary current.

According to yet another embodiment, a method for regulating a power converter includes receiving a first input signal and a second input signal, processing information associated with the first input signal and the second input signal, and generating a first comparison signal based on at least information associated with the first input signal and the second input signal, the first input signal being associated with at least a feedback signal related to an output current of the power converter. The method further includes receiving at least the first comparison signal, processing information associated with the first comparison signal, and generating a modulation signal based on at least information associated with the first comparison signal, the modulation signal being associated with a modulation frequency. In addition, the method includes receiving the modulation signal, processing information associated with the modulation signal, and outputting a drive signal to a switch to adjust a primary current flowing through a primary winding of the power converter, the primary current being associated with a peak magnitude for each modulation period corresponding to the modulation frequency. Moreover, the method includes sampling the feedback signal to generate a first sampled signal for a first modulation period, sampling the feedback signal to generate a second sampled signal for a second modulation period, the second modulation period being after the first modulation period. Furthermore, the method includes determining whether the first sampled signal subtracted by the second sampled signal is larger than a first threshold voltage, the first threshold voltage being larger than or equal to zero, and if the first sampled signal subtracted by the second sampled signal is determined to be larger than the first threshold voltage, increasing the modulation frequency and the peak magnitude related to the primary current. Additionally, the method includes determining whether the second sampled signal subtracted by the first sampled signal is larger than a second threshold voltage, the second threshold voltage being larger than or equal to zero, and if the second sampled signal subtracted by the first sampled signal is determined to be larger than the second threshold voltage, decreasing the modulation frequency and the peak magnitude related to the primary current.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 3:
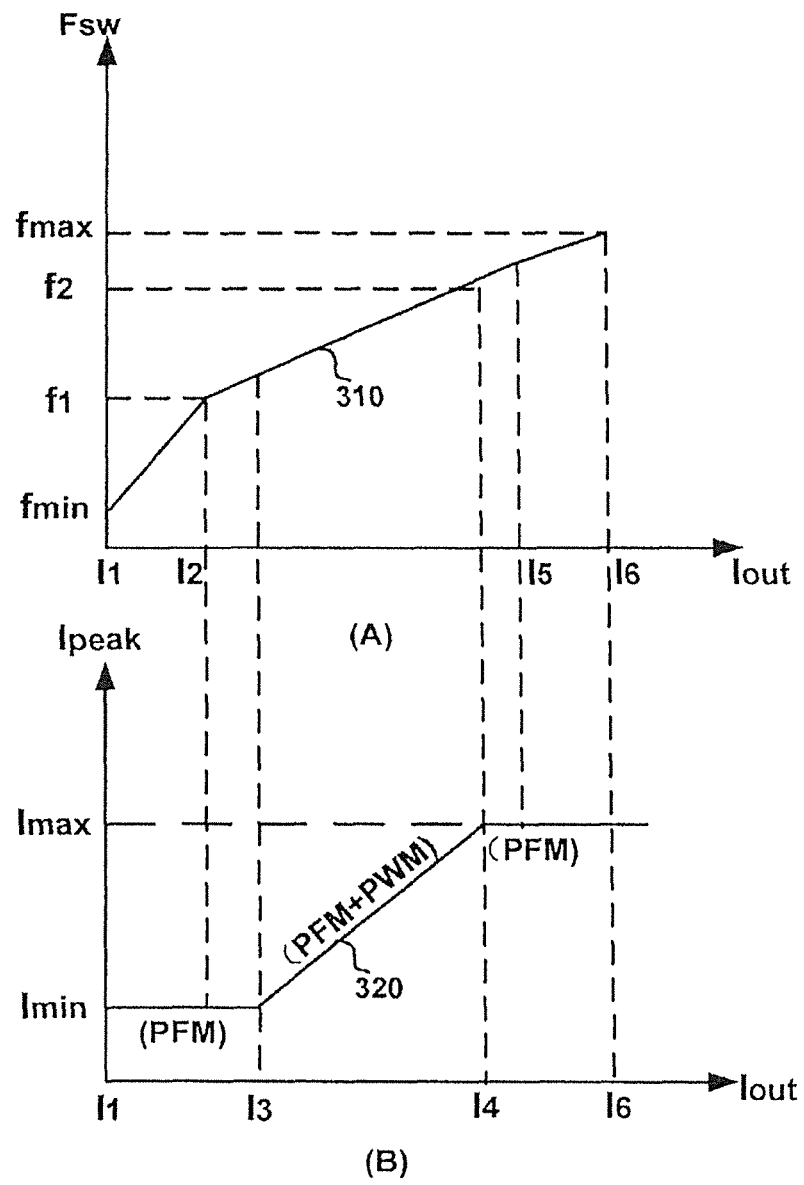

FIGS. 3(A) and (B) are simplified diagrams showing switching frequency and peak current as functions of output current of a power conversion system in the constant-voltage (CV) mode according to an embodiment of the present invention.

Figure 4:
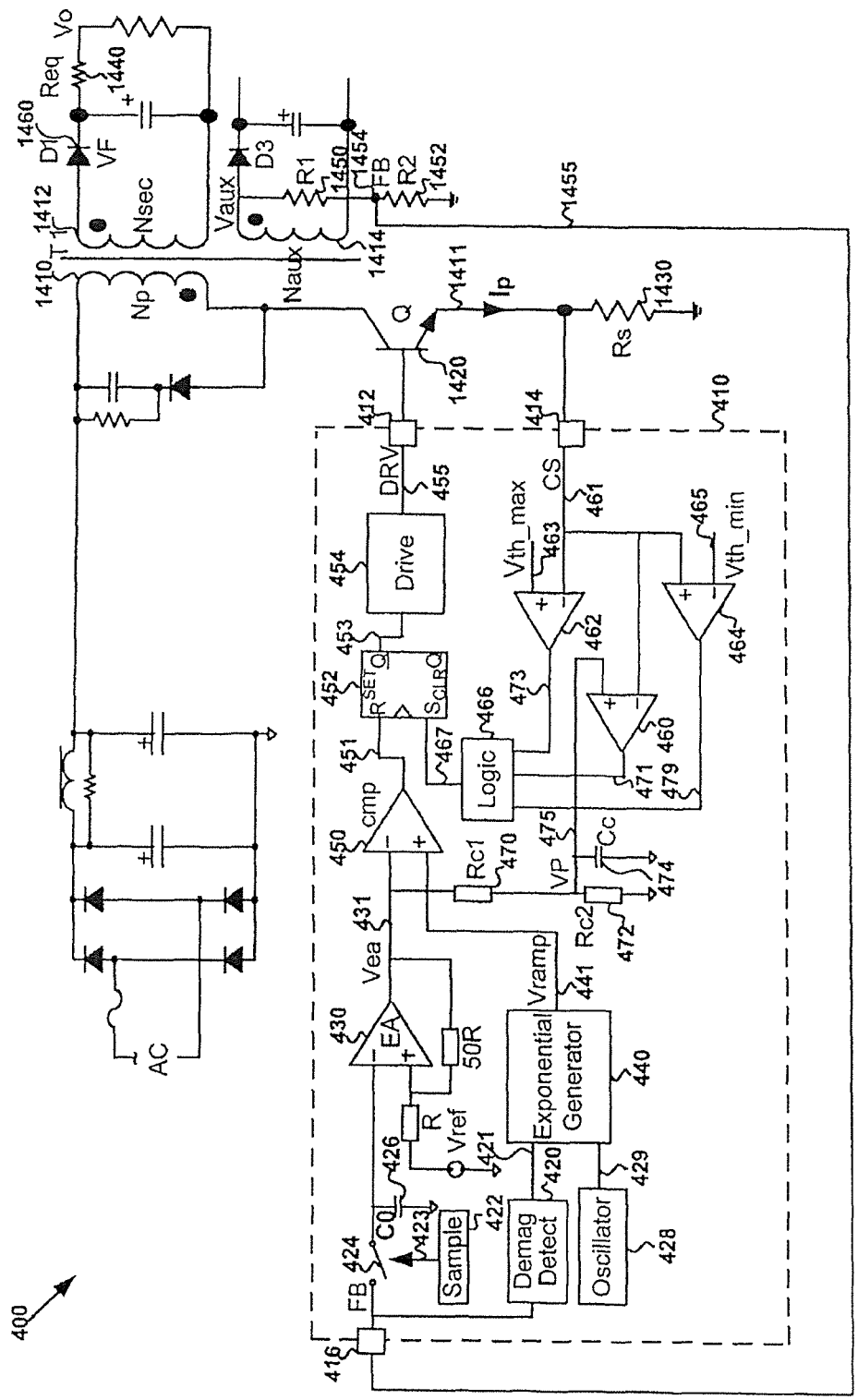

FIG. 4 is a simplified diagram showing a power conversion system that adjusts switching frequency and peak current in response to output current according to an embodiment of the present invention.

Figure 5:
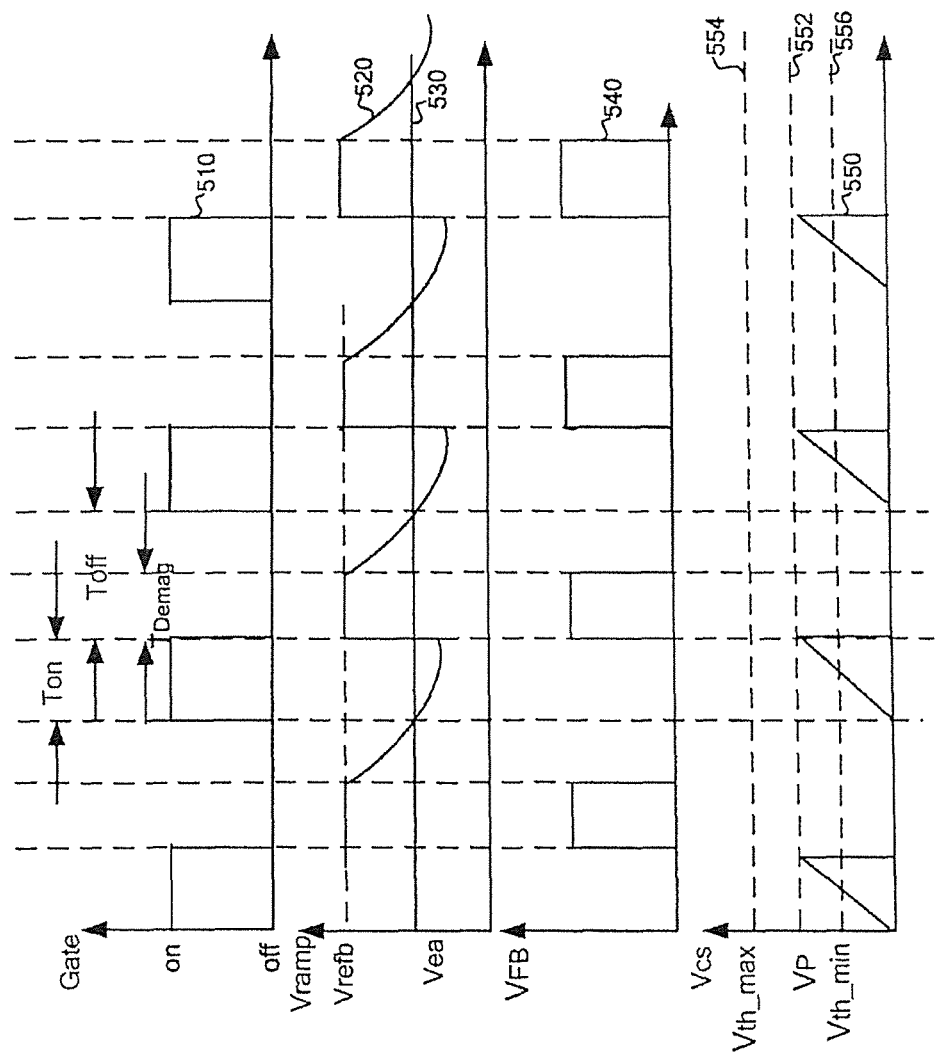

FIG. 5 is a simplified timing diagram for the switch-mode power conversion system 400 with constant voltage control according to an embodiment of the present invention.

Figure 6:
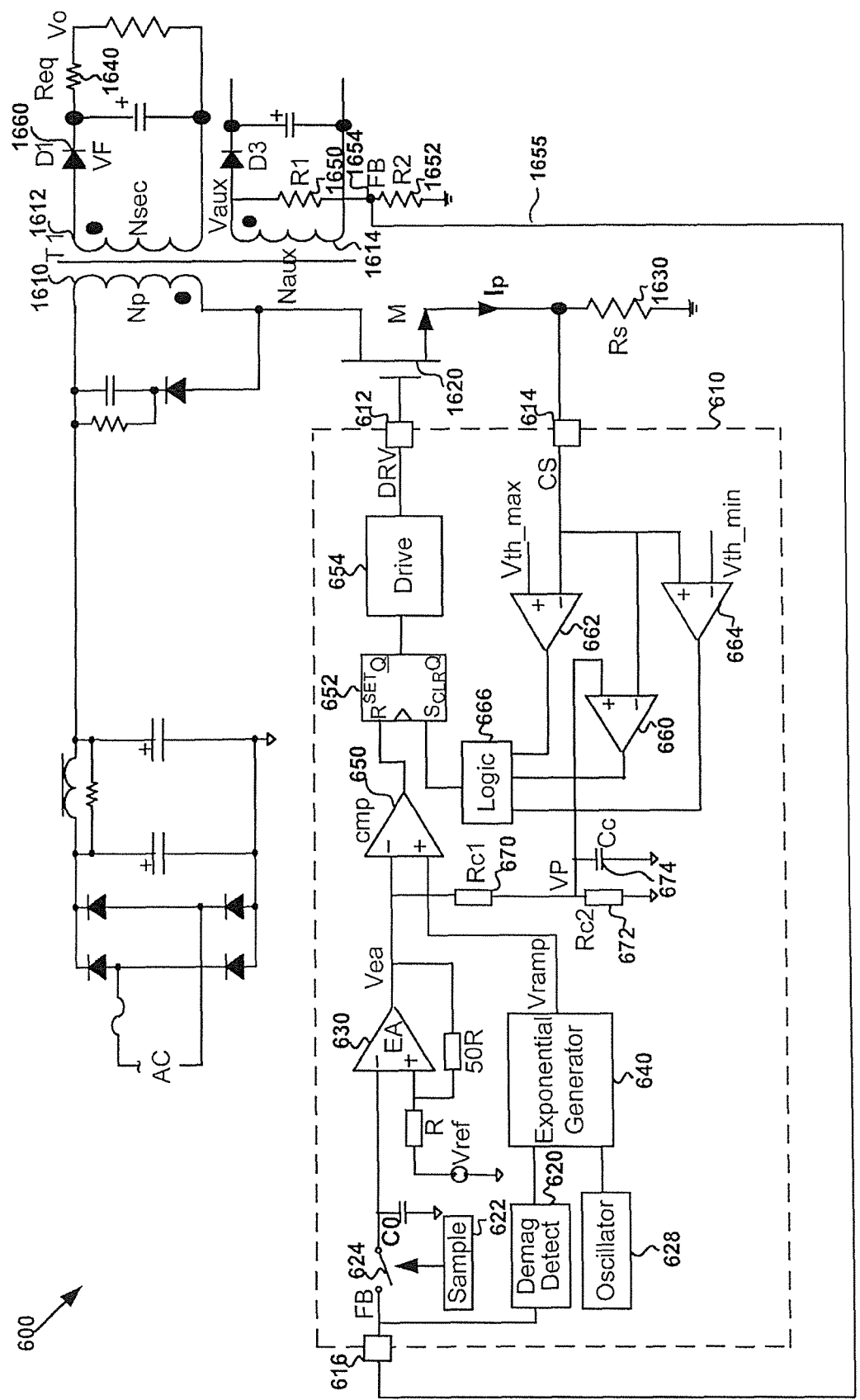

FIG. 6 is a simplified diagram showing a power conversion system that adjusts switching frequency and peak current in response to output current according to another embodiment of the present invention.

Figure 7:
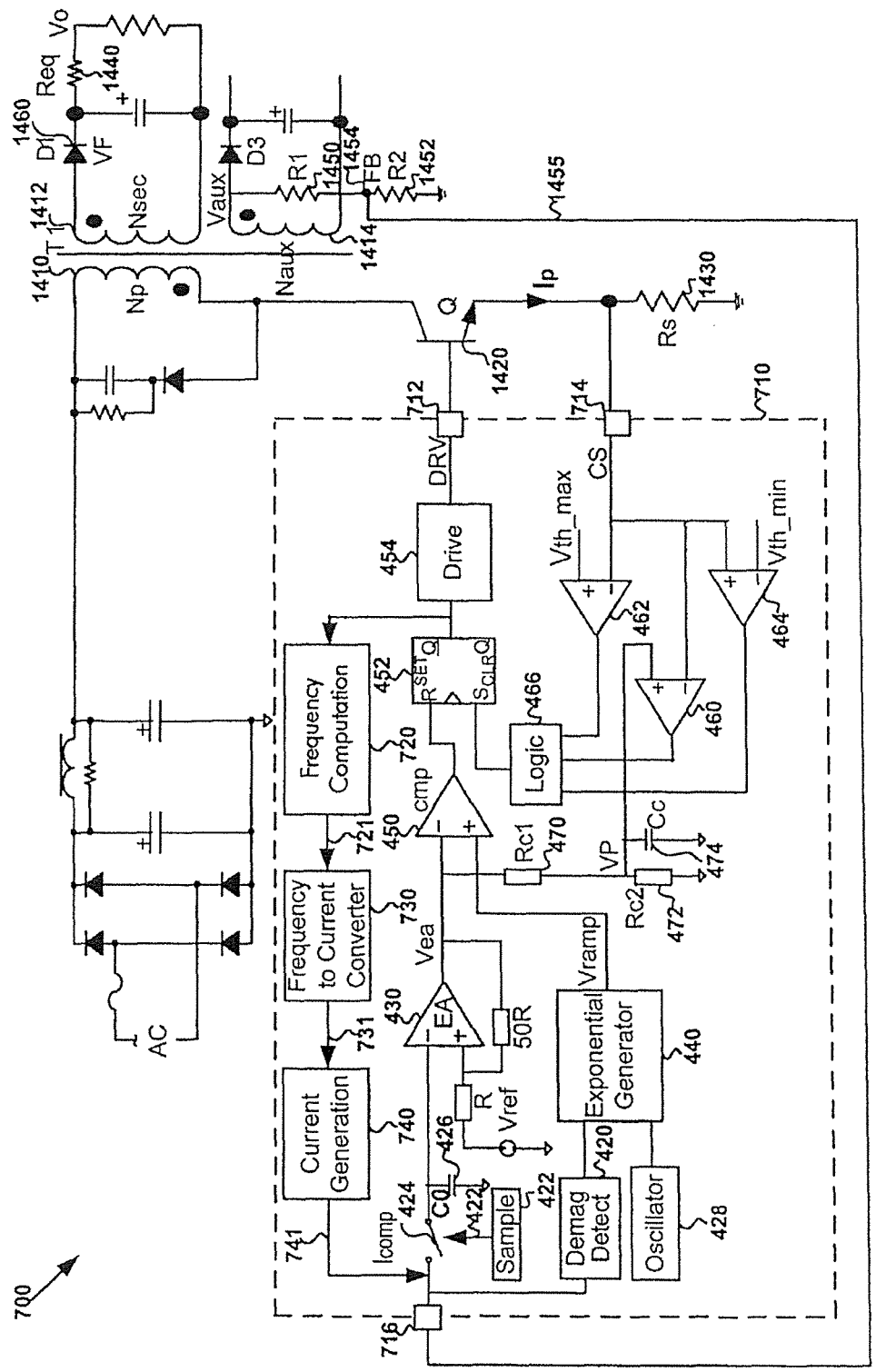

FIG. 7 is a simplified diagram showing a power conversion system that adjusts switching frequency and peak current in response to output current with voltage compensation according to yet another embodiment of the present invention.

Figure 8:
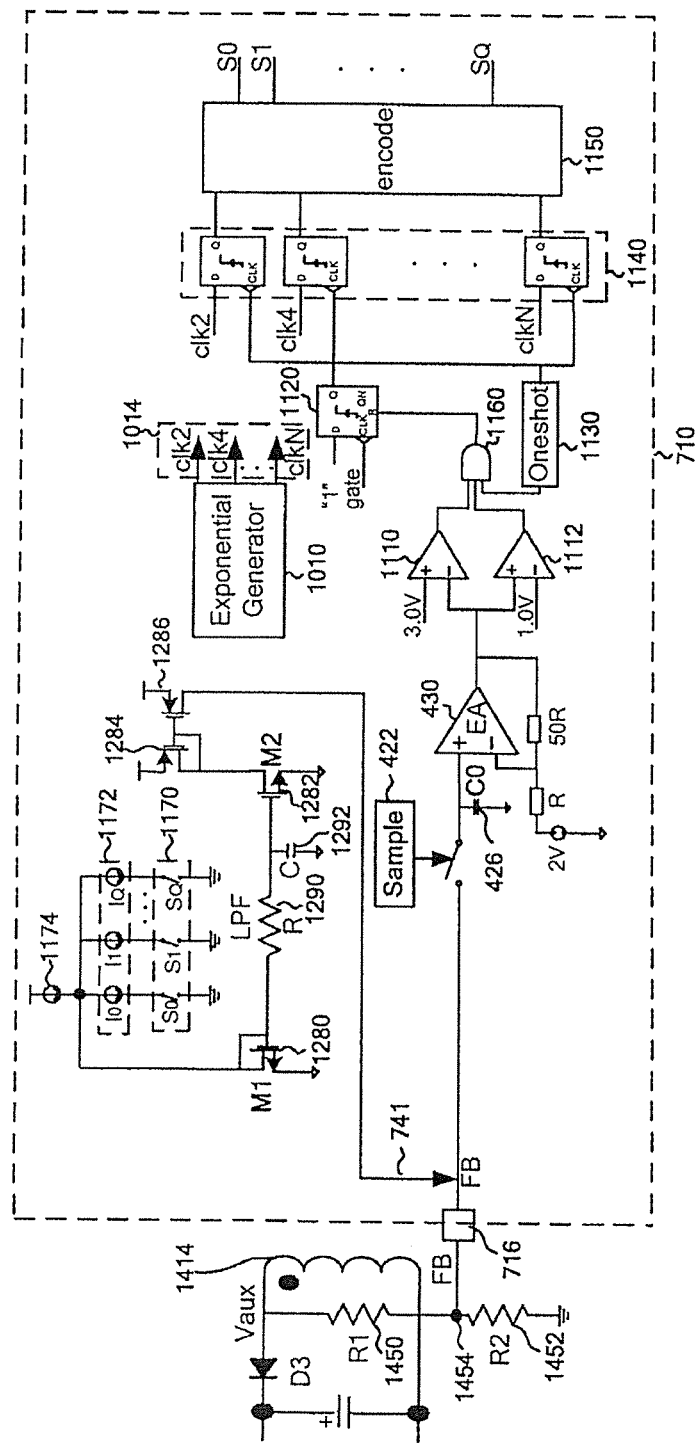

FIG. 8 is a simplified diagram showing a compensation current generator for the power conversion system 700 according to an embodiment of the present invention.

Figure 9:
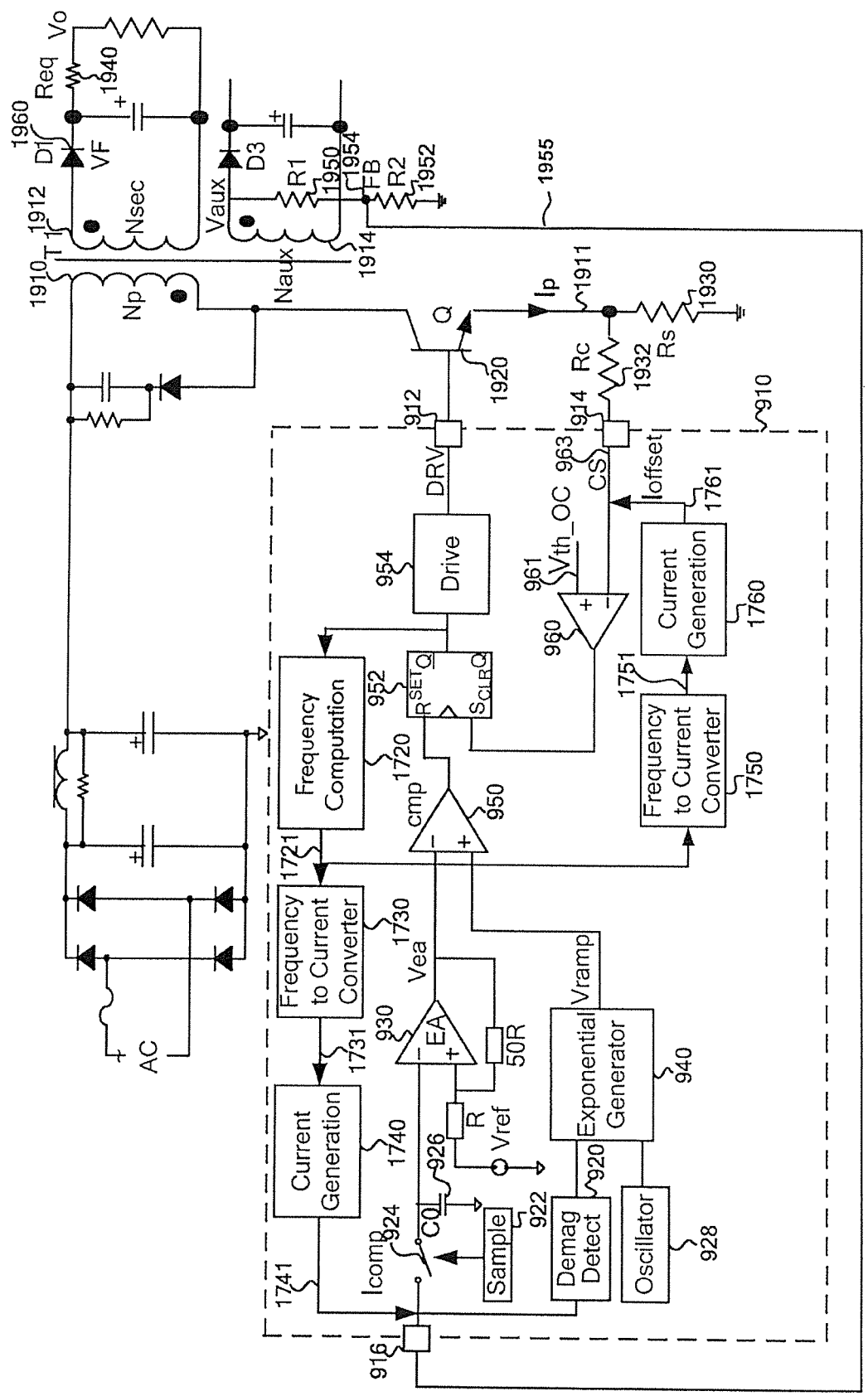

FIG. 9 is a simplified diagram showing a power conversion system that adjusts switching frequency and peak current in response to output current with offset modulation current according to yet another embodiment of the present invention.

Figure 10:
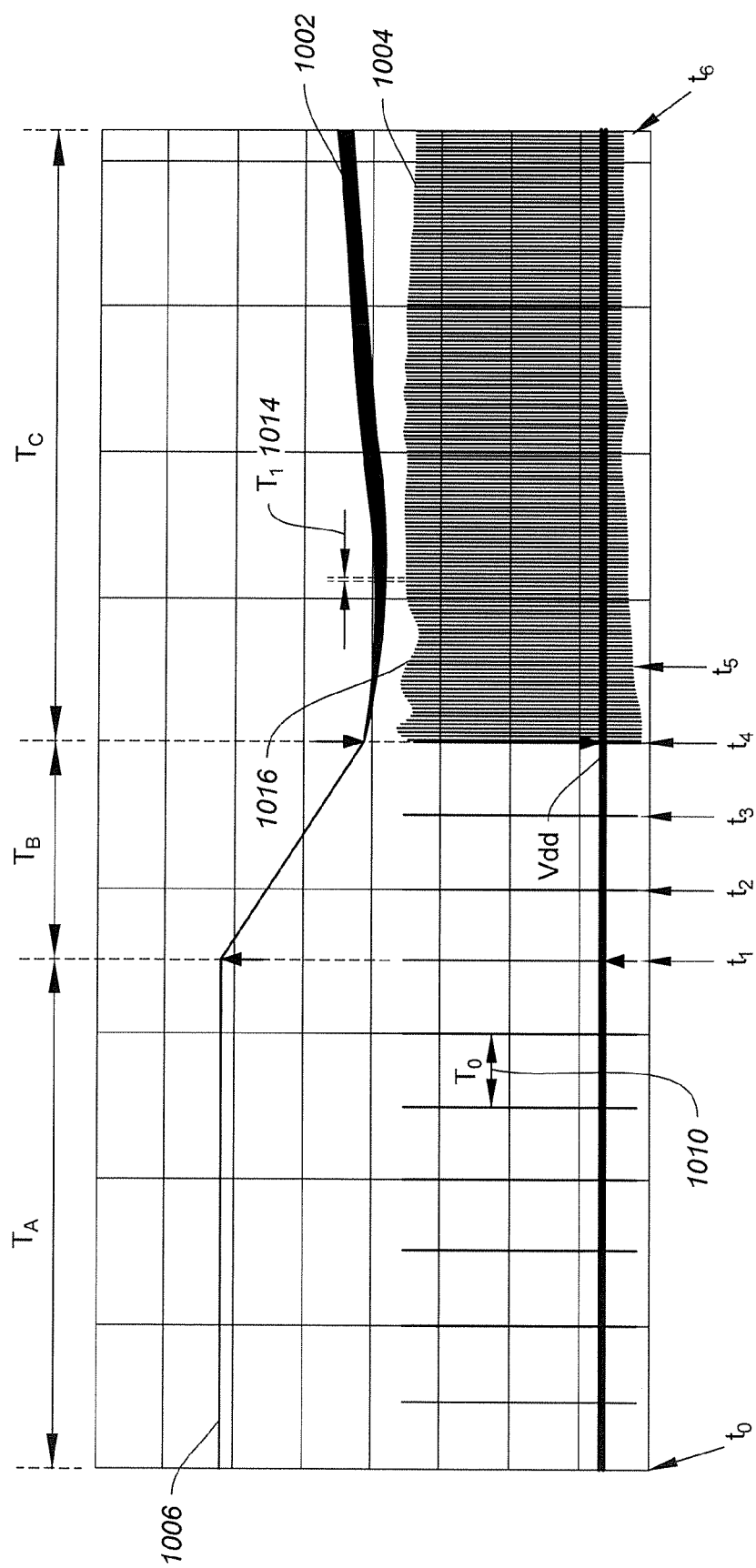

FIG. 10 is a simplified timing diagram for the switch-mode power conversion system according to another embodiment of the present invention.

Figure 11:
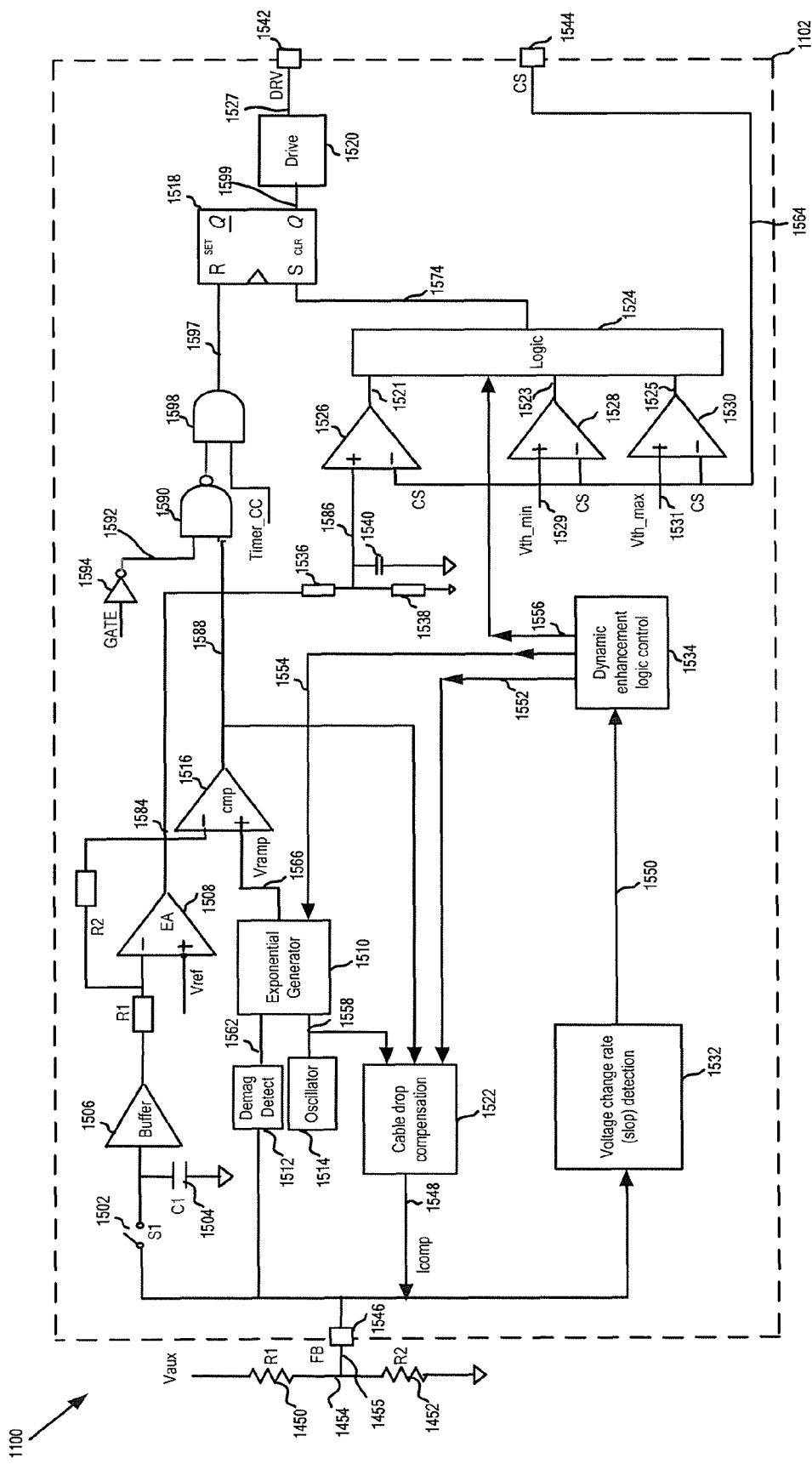

FIG. 11 is a simplified diagram showing certain components of a power conversion system that dynamically adjusts switching frequency and peak current in response to output current according to yet another embodiment of the present invention.

Figure 12:
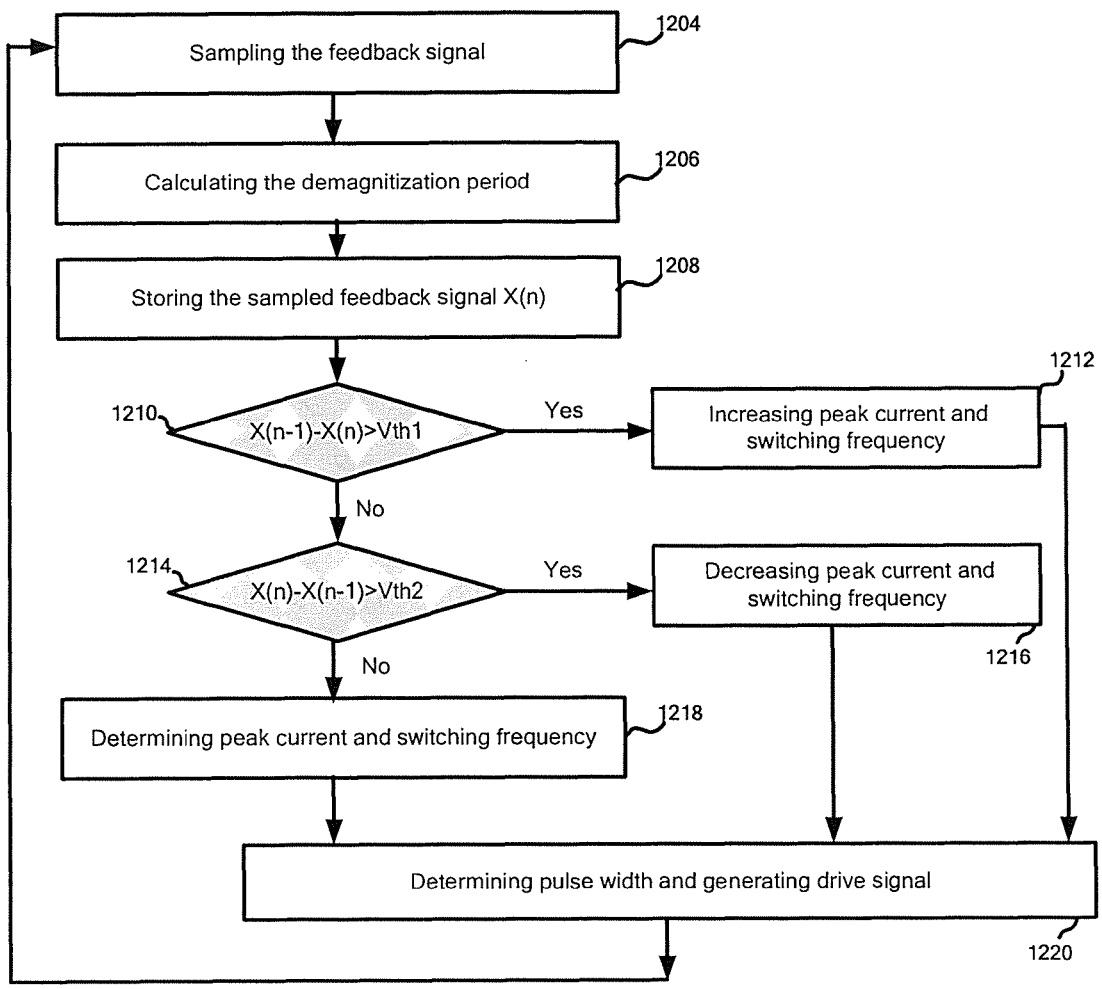

FIG. 12 is a simplified flow diagram showing dynamic adjustment of the switching frequency and the peak current of the primary winding in the power conversion system according to one embodiment of the present invention.

Figure 13:
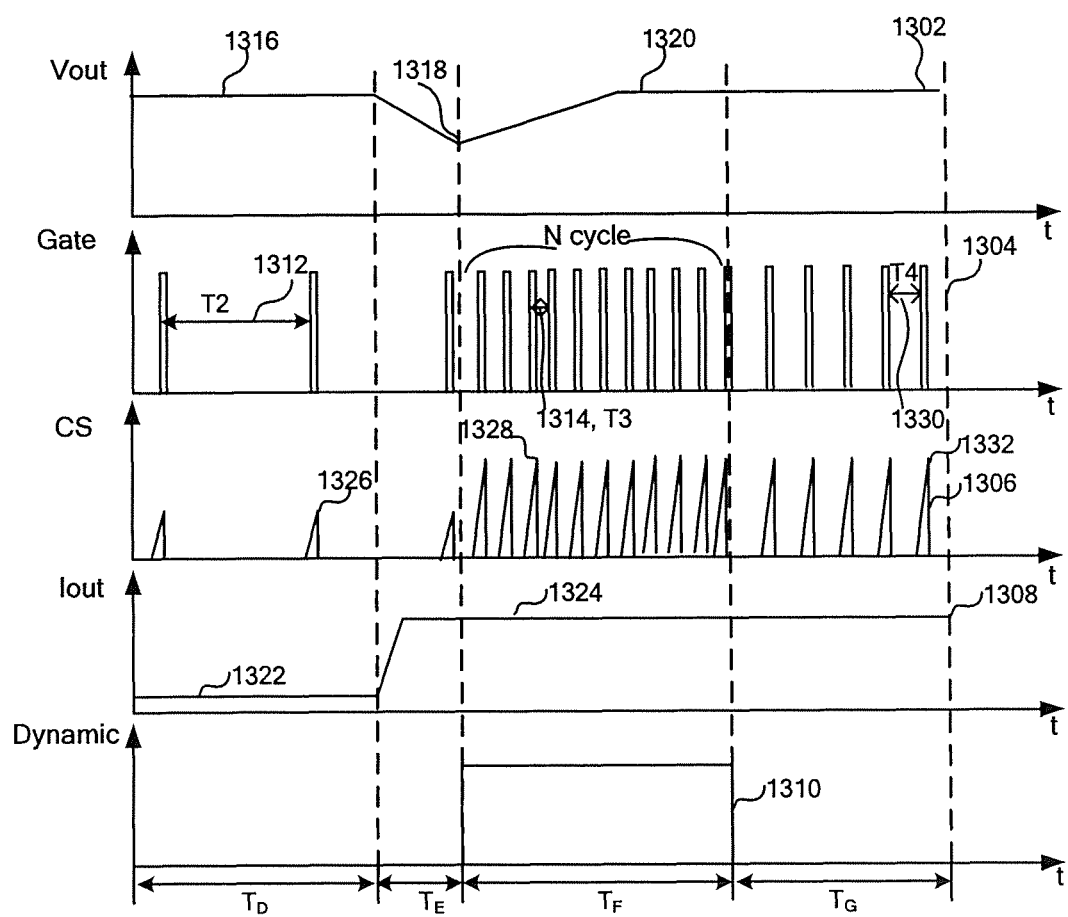

FIG. 13 is a simplified timing diagram for the switch-mode power conversion system with dynamic adjustment of the switching frequency and the peak current of the primary winding according to an embodiment of the present invention.

Figure 14:
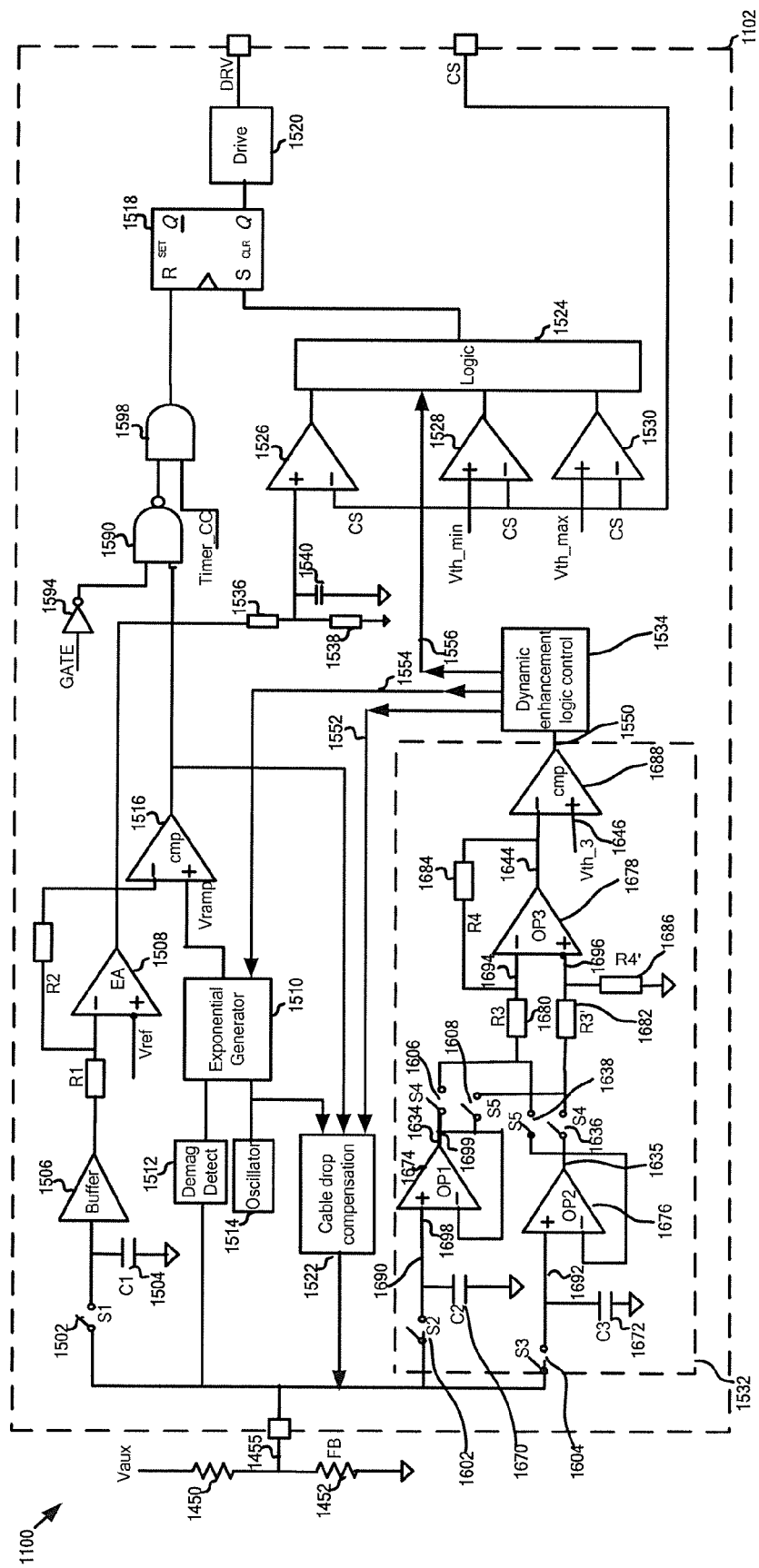

FIG. 14 is a simplified diagram showing certain components of the power conversion system according to yet another embodiment of the present invention.

Figure 15:
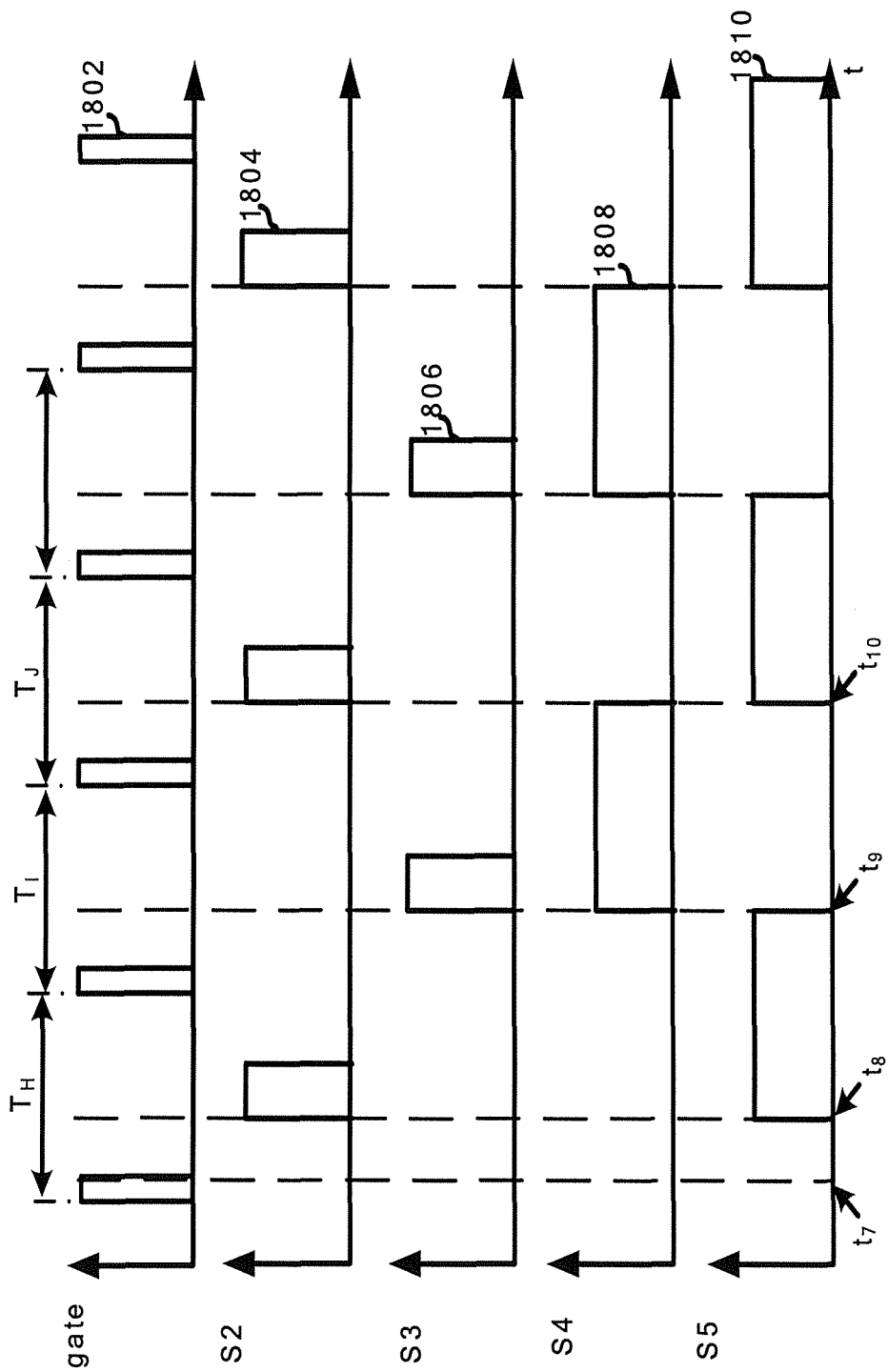

FIG. 15 is a simplified timing diagram for the switch-mode power conversion system as shown in FIG. 14 according to yet another embodiment of the present invention.

Figure 16:
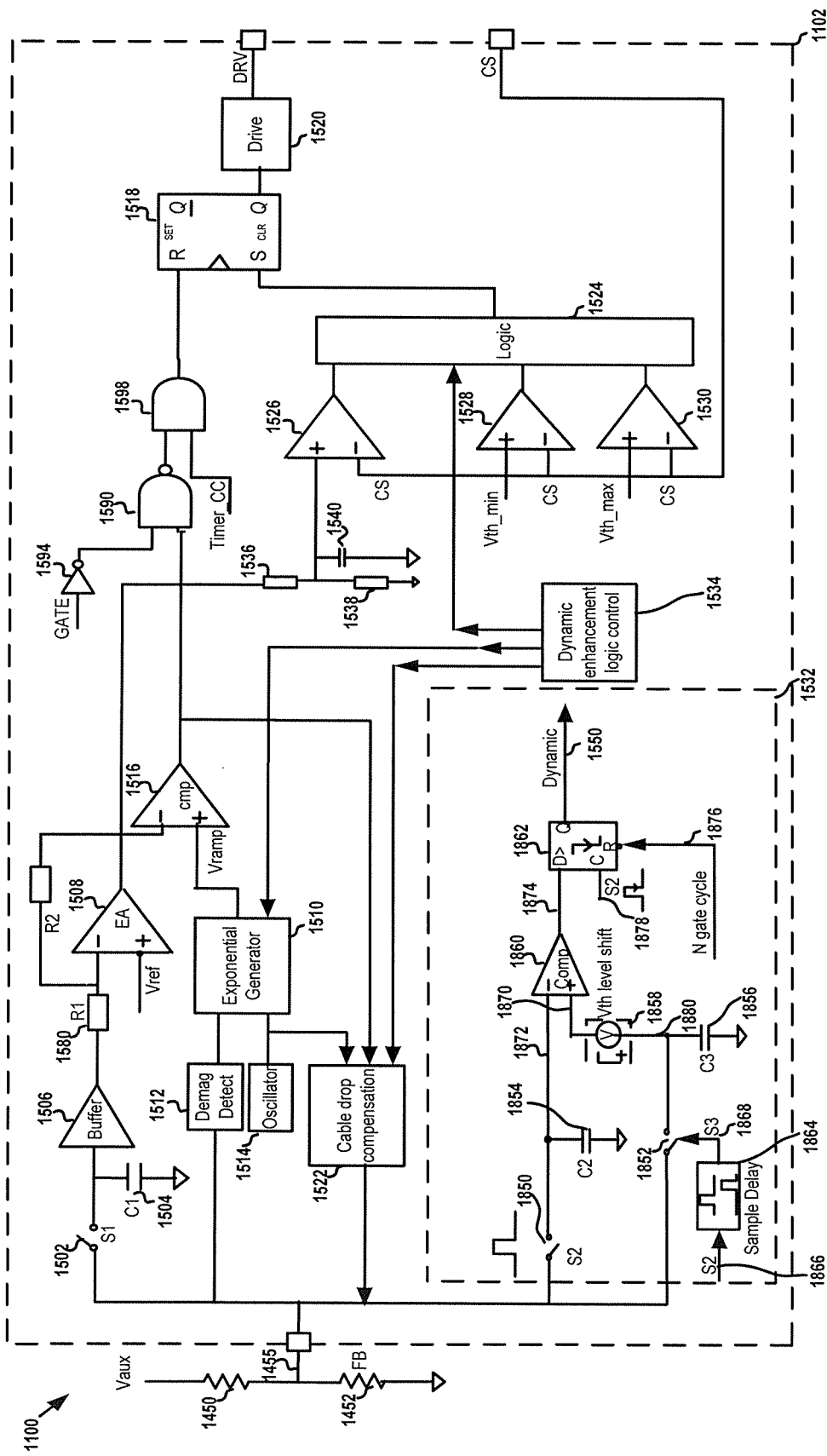

FIG. 16 is a simplified diagram showing certain components of the power conversion system according to yet another embodiment of the present invention.

Figure 17:
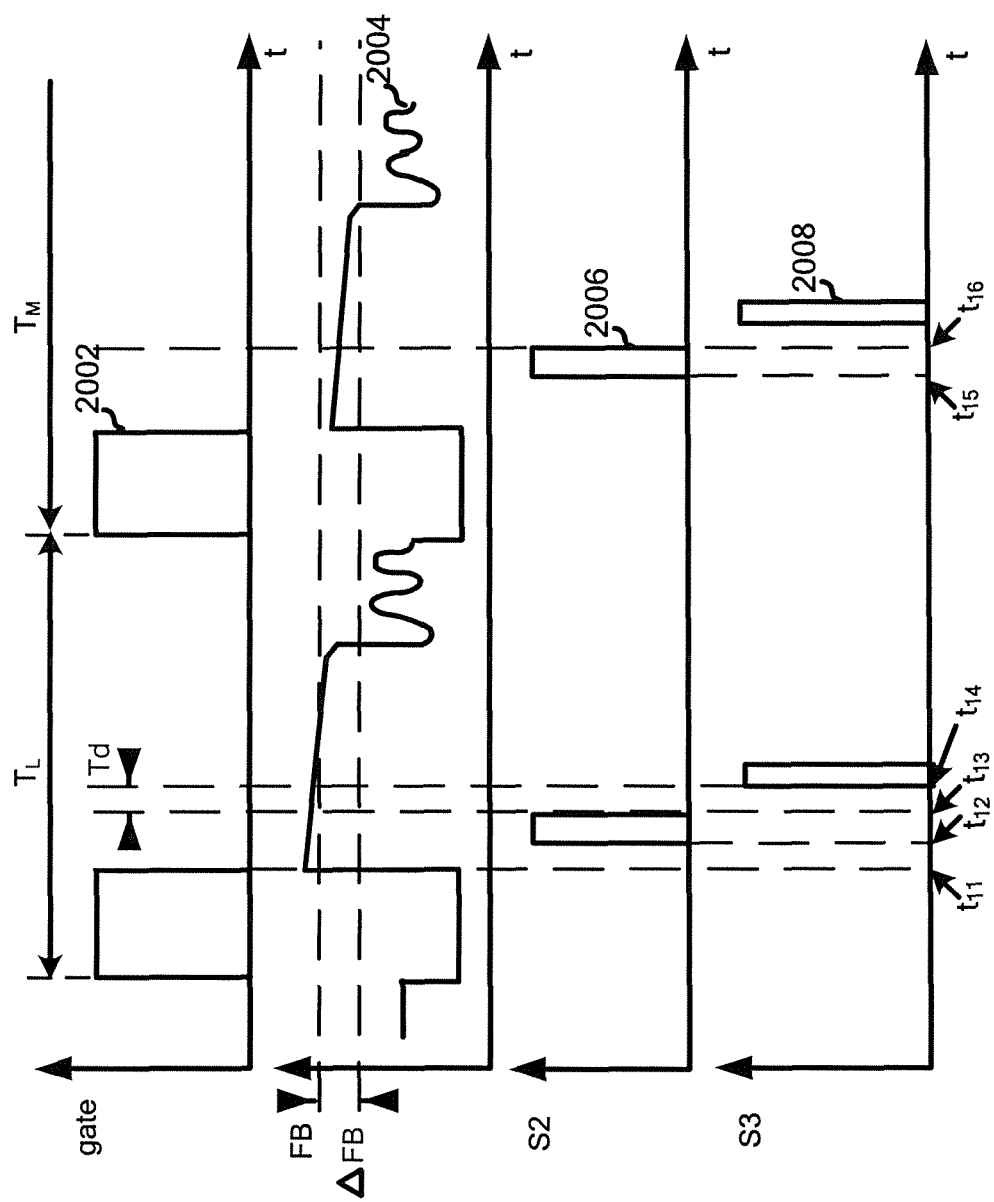

FIG. 17 is a simplified timing diagram for the switch-mode power conversion system as shown in FIG. 16 according to yet another embodiment of the present invention.

5. DETAILED DESCRIPTION OF THE INVENTION

The present invention is directed to integrated circuits. More particularly, the invention provides switching frequency and peak current adjustments in response to loading changes. Merely by way of example, the invention has been applied to a flyback power converter. But it would be recognized that the invention has a much broader range of applicability.

Figure 1:
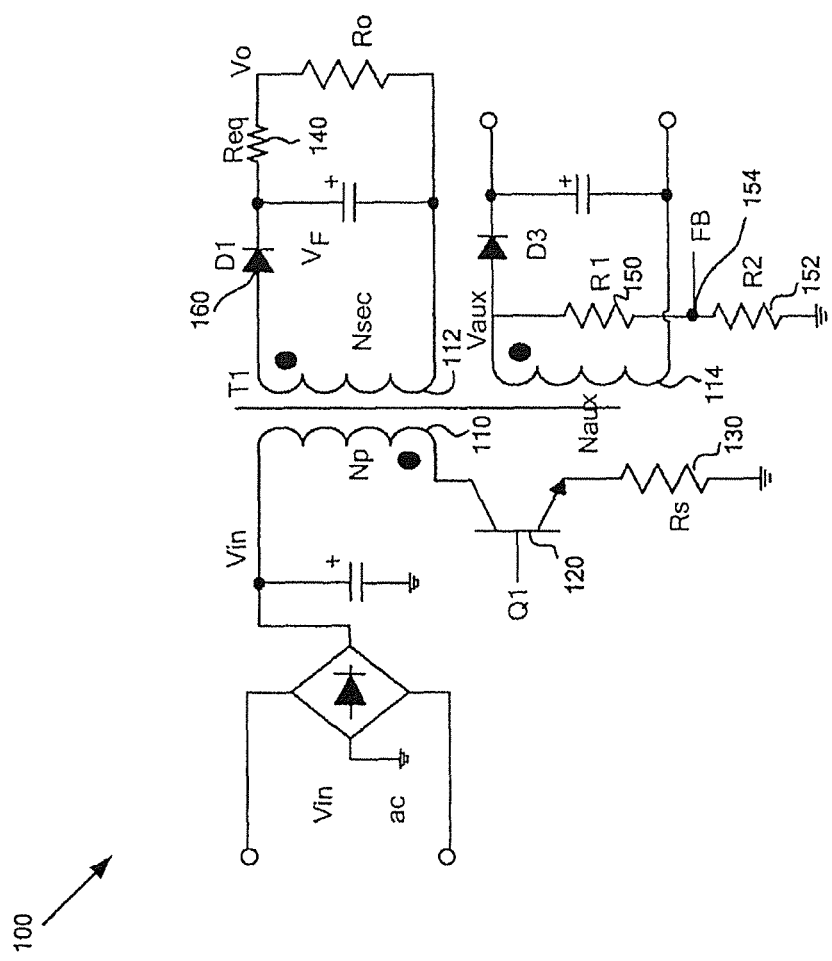
FIG. 1 is a simplified diagram showing a conventional flyback power conversion system with primary-side sensing and regulation.
Figure 2:
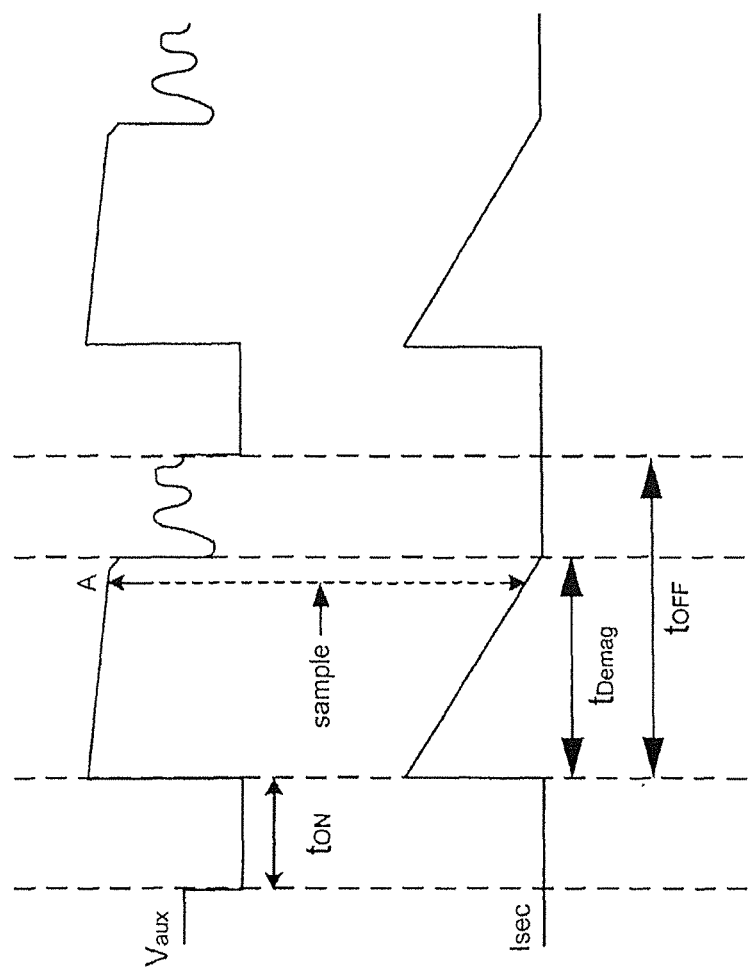
FIG. 2 is a simplified diagram showing a conventional operation mechanism for the flyback power conversion system 100.

Referring to FIGS. 1 and 2, information about the output voltage of the power conversion system 100 often is sampled only once every switching period. The switching period is inversely proportional to the switching frequency, which usually is set low at no load or light load conditions to reduce power consumption. But the low switching frequency often leads to poor dynamic response for the power conversion system 100 if the load changes from no load or light load to full load. For example, if the switching frequency is several hundred Hz at no load or light load conditions, information about the output voltage of the power conversion system 100 is sampled once every several msec. If the load changes from no load or light load to full load (e.g., the output current changing to 1 A at full load), the output voltage may drop below an acceptable level, because the controller does not respond until the next sampling is performed after, for example, several msec. One way to solve this problem is to increase the switching frequency at no load or light load conditions. But if the switching frequency is increased, the peak current of the primary winding at no load or light load conditions should be limited such that the output voltage does not exceed an acceptable level.

FIGS. 3(A) and (B) are simplified diagrams showing switching frequency and peak current as functions of output current of a power conversion system in the constant-voltage (CV) mode according to an embodiment of the present invention. These diagrams are merely examples, which should not unduly limit the scope of the claims. One of ordinary skill in the art would recognize many variations, alternatives, and modifications. The curve 310 represents the switching frequency (e.g., $F_{sw}$) as a function of output current (e.g., $I_{out}$), and the curve 320 represents the peak current (e.g., $I_{peak}$) for the primary winding as a function of output current (e.g., $I_{out}$). For example, if $I_{out}=I_1$, the power conversion system is at no load conditions, and if $I_{out}=I_6$, the power conversion system is at full load conditions. In another example, $I_1<I_2<I_3<I_4<I_5<I_6$.

As shown in FIG. 3(A), the switching frequency (e.g., $F_{sw}$) changes with the output current (e.g., $I_{out}$) at a slope $S_{1f}$ if $I_1 \leq I_{out} < I_2$, at a slope $S_{2f}$ if $I_2 \leq I_{out} < I_5$, and at a slope $S_{3f}$ if $I_5 \leq I_{out} < I_6$ according to one embodiment. For example, each of the slopes $S_{1f}$, $S_{2f}$, and $S_{3f}$ is larger than zero.

As shown in FIG. 3(B), the peak current (e.g., $I_{peak}$) for each switching period (e.g., $T_{sw}$) changes with the output current (e.g., $I_{out}$) at a slope $S_{1p}$ if $I_1 \leq I_3$, at a slope $S_{2p}$ if $I_3 \leq I_{out} < I_4$, and at a slope $S_{3p}$ if $I_4 \leq I_{out} < I_6$ according to another embodiment. For example, the slopes $S_{1p}$ and $S_{3p}$ each are equal to or larger than zero. In another example, the slope $S_{2p}$ is larger than zero. According to yet another embodiment, the power conversion system operates with pulse-frequency modulation for $I_1 \leq I_{out} < I_3$, with both pulse-frequency modulation and pulse-width modulation for $I_3 \leq I_{out} < I_4$, and with pulse-frequency modulation for $I_4 \leq I_{out} < I_6$. For example, the slopes $S_{1p}$ and $S_{3p}$ each are equal to zero, and the peak current (e.g., $I_{peak}$) increases from $I_{min}$ to $I_{max}$ at the slope $S_{2p}$.

FIG. 4 is a simplified diagram showing a power conversion system that adjusts switching frequency and peak current in response to output current according to an embodiment of the present invention. This diagram is merely an example, which should not unduly limit the scope of the claims. One of ordinary skill in the art would recognize many variations, alternatives, and modifications.

The power conversion system 400 includes a primary winding 1410, a secondary winding 1412, an auxiliary winding 1414, a switch 1420 (e.g., a bipolar transistor), a current sensing resistor 1430, an equivalent resistor 1440 for an output cable, resistors 1450 and 1452, and a rectifying diode 1460. Additionally, the power conversion system 400 also includes a demagnetization detector 420, a sampling controller 422, a sampling switch 424, a capacitor 426, an oscillator 428, an error amplifier 430, an exponential generator 440, a comparator 450, a flip-flop component 452, a gate driver 454, comparators 460, 462, and 464, a logic component 466, resistors 470 and 472, and a capacitor 474.

For example, the primary winding 1410, the secondary winding 1412, the auxiliary winding 1414, the switch 1420, the current sensing resistor 1430, the equivalent resistor 1440, the resistors 1450 and 1452, and the rectifying diode 1460 are the same as the primary winding 110, the secondary winding 112, the auxiliary winding 114, the switch 120, the current sensing resistor 130, the equivalent resistor 140, the resistors 150 and 152, and the rectifying diode 160, respectively. In another example, the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, and the capacitor 474 are located on a chip 410. In yet another example, the chip 410 includes terminals 412, 414, and 416.

FIG. 5 is a simplified timing diagram for the switch-mode power conversion system 400 with constant voltage control according to an embodiment of the present invention. This diagram is merely an example, which should not unduly limit the scope of the claims. One of ordinary skill in the art would recognize many variations, alternatives, and modifications.

As shown in FIG. 5, the waveform 510 represents turned-on and turned-off conditions of the switch 1420 as a function of time, the waveform 520 represents a ramping signal (e.g., $V_{ramp}$) as a function of time, the waveform 530 represents an amplified signal 431 (e.g., $V_{ea}$) as a function of time, and the waveform 540 represents a feedback signal 1455 as a function of time. Additionally, the waveform 550 represents a sensed signal 461 (e.g., $V_{cs}$) as a function of time, the waveform 552 represents a control signal 475 (e.g., $V_p$) as a function of time, and the waveform 554 represents a threshold signal 473 (e.g., $V_{th\_max}$) as a function of time.

As shown in FIGS. 4 and 5, information about the output voltage is extracted through the auxiliary winding 1414 according to one embodiment. For example, the auxiliary winding 1414, together with the resistors 1450 and 1452, generates the feedback signal 1455 (e.g., $V_{FB}$ corresponding to the waveform 540) at a node 1454. In another example, the feedback signal 1455 (e.g., $V_{FB}$) is received by at least the demagnetization detector 420 and the sampling switch 424.

In response, the demagnetization detector 420 outputs a signal 421 to the exponential generator 440 according to one embodiment. For example, the oscillator 428 also outputs a clock signal 429 to the exponential generator 440. In another example, the exponential generator 440 generates a ramping signal 441 (e.g., $V_{ramp}$ corresponding to the waveform 520) as follows:

$$V_{ramp}(n) = (V_{refb} - V_{refa}) \times e^{-\left(\frac{n \times T}{\tau}\right)} + V_{refa} \qquad \text{(Equation 5)}$$

where $V_{ramp}$ represents the voltage magnitude of the ramping signal 441. Additionally, $V_{refa}$ and $V_{refb}$ each represent a constant voltage level. For example, $V_{refa}$ equals 1V, and $V_{refb}$ equals 3V. Moreover, n represents the time for the ramping signal 441 to fall from $V_{refb}$ since the last reset of the ramping signal 441 in terms of the number of the clock periods. T is the clock period of the clock signal 429. Furthermore, $\tau$ is the time constant. Specifically, if $0 \leq n \leq 64$, $\tau = 128 \times T$; if $64 < n \leq 128$, $\tau = 256 \times T$; if $128 < n \leq 256$, $\tau = 512 \times T$; and if $256 < n \leq 512$, $\tau = 1024 \times T$.

In one embodiment, when the switch 1420 is turned off, the energy stored in the transformer is released to the output terminal. For example, the demagnetization process starts, and the current flowing through the secondary winding 1412 ramps down linearly. For example, when the demagnetization process almost ends and the current flowing through the secondary winding 1412 approaches zero, a sampling signal 423 is generated by the sampling controller 422 to sample the feedback signal 1455 (e.g., $V_{FB}$ corresponding to the waveform 540) by closing the sampling switch 424. In another example, after the sampling process is completed, the sampling switch 424 is open in response to the sampling signal 423. In yet another example, the sampled voltage is held on the capacitor 426, and compared with a reference voltage $V_{ref}$, such as 2V.

The difference between the sampled/held voltage and the reference voltage $V_{ref}$ is amplified by the error amplifier 430 to generate the amplified signal 431 (e.g., $V_{ea}$ correspond to the waveform 530) according to an embodiment. According to another embodiment, the amplified signal 431 is received by the resistor 470 and the negative input terminal of the comparator 450. For example, the resistor 470, together with the resistor 472 and the capacitor 474, outputs the control signal 475 (e.g., $V_p$ corresponding to the waveform 552) to the comparator 460. In another example, the resistors 470 and 472 and the capacitor 474 form a compensation network, which perform attenuation and low-pass filtering to the amplified signal 431 and generates the control signal 475. In yet another example, the comparator 450 also receives the ramping signal 441 (e.g., $V_{ramp}$ corresponding to the waveform 520) at the positive input terminal, and in response sends an output signal 451 to the flip-flop component 452.

As shown in FIG. 5, when the demagnetization process starts, the ramping signal 441 (e.g., $V_{ramp}$ corresponding to the waveform 520) is restored to an initial value (e.g., $V_{refb}$), but after the demagnetization process is completed, the ramping signal 441 decreases exponentially according to one embodiment. In another embodiment, if the ramping signal 441 becomes smaller than the amplified signal 431 (e.g., $V_{ea}$ corresponding to the waveform 530) in magnitude, the comparison signal 451 changes to the logic low level, causing the signal 453 to change to the logic high level and causing the switch 1420 to be turned on.

In another embodiment, a primary current 1411 that flows through the primary winding 1410 is sensed by the current sensing resistor 1430, which in response outputs the sensed signal 461 (e.g., $V_{cs}$ corresponding to the waveform 550) to the comparators 460, 462, and 464. For example, if the switch 1420 is closed (e.g., being turned on), the transformer stores energy and the primary current 1411 ramps up linearly, causing the sensed signal 461 (e.g., $V_{cs}$) to also ramp up linearly. In another example, the positive terminal of the comparator 460 receives the control signal 475 (e.g., $V_p$ corresponding to the waveform 552), and the negative terminal of the comparator 460 receives the sensed signal 461. In another example, the positive terminal of the comparator 462 receives the threshold signal 463 (e.g., $V_{th\_max}$ corresponding to the waveform 554), and the negative terminal of the comparator 462 receives the sensed signal 461. In yet another example, the positive terminal of the comparator 464 receives the sensed signal 461, and the negative terminal of the comparator 464 receives a threshold signal 465 (e.g., $V_{th\_min}$ which is smaller than $V_{th\_max}$ in magnitude).

In yet another embodiment, the comparators 460, 462, and 464 generate comparison signals 471, 473, and 479 respectively, all of which are received by the logic component 466. For example, the logic component 466 in response generates a logic signal 467.

According to one embodiment, the flip-flop component 452 receives the comparison signal 451 and the logic signal 467, and in response generates a signal 453. For example, as shown in FIG. 5, if the comparison signal 451 is at the logic low level but the logic signal 467 is at the logic high level, the signal 453 is at the logic high level, and if the comparison signal 451 is at the logic low level and the logic signal 467 is also at the logic low level, the signal 453 is at the logic low level. In another example, if the logic signal 467 is at the logic low level, the signal 453 from the $\overline{Q}$ terminal is also at the logic low level in order to turn off the switch 1420, regardless of whether the comparison signal 451 is at the logic high level or at the logic low level. In yet another example, if the logic signal 467 is at the logic high level and the comparison signal 451 is at the logic low level, the signal 453 is at the logic high level to turn on the switch 1420.

According to another embodiment, the signal 453 is received by the gate driver 454, which outputs a drive signal 455 to the switch 1420 through the terminal 412 (e.g., outputting the base current 455 to the bipolar transistor 1420 through the terminal 412). For example, if the signal 453 is at the logic high level, the drive signal 455 causes the switch 1420 to be closed (e.g., being turned on as shown by the waveform 510). In another example, if the signal 453 is at the logic low level, the drive signal 455 causes the switch 720 to be open (e.g., being turned off as shown by the waveform 510).

As shown in FIGS. 4 and 5, the larger the output loading (e.g., the output current) is, the larger the amplified signal 431 (e.g., $V_{ea}$ corresponding to the waveform 530) becomes, causing the off-time (e.g., $T_{off}$) of the switch 1420 to become shorter and the switching frequency (e.g., $F_{sw}$) to become higher according to one embodiment. According to another embodiment, the smaller the output loading (e.g., the output current) is, the smaller the amplified signal 431 (e.g., $V_{ea}$ corresponding to the waveform 530) becomes, causing the off-time (e.g., $T_{off}$) of the switch 1420 to become longer and the switching frequency (e.g., $F_{sw}$) to become lower as shown in FIG. 3(A).

According to yet another embodiment, the logic component 466 includes an OR gate and other components. For example, if the control signal 475 (e.g. $V_p$) is smaller than the threshold signal 465 (e.g., $V_{th\_min}$) in magnitude, the peak magnitude of the sensed signal 461 (e.g., $V_{cs}$ corresponding the waveform 550) is limited to the magnitude of the threshold signal 465 (e.g., $V_{th\_min}$ corresponding to the waveform 556), and the on-time of the switch 1420 (e.g., $T_{on}$) and the peak magnitude of the primary current 1411 remains constant regardless of the output loading (e.g., the output current) as shown for $I_1 \leq I_{out} < I_3$ in FIG. 3(B).

In another example, if the control signal 475 (e.g., $V_p$) is larger than the threshold signal 465 (e.g., $V_{th\_min}$) but smaller than the threshold signal 463 (e.g., $V_{th\_max}$) in magnitude, the peak magnitude of the sensed signal 461 (e.g., $V_{cs}$ corresponding the waveform 550) is limited to the magnitude of the control signal 475 (e.g., $V_p$ corresponding to the waveform 552). For example, the control signal 475 (e.g., $V_p$) increases with the output loading (e.g., the output current) in magnitude; hence both the on-time of the switch 1420 (e.g., $T_{on}$) and the peak magnitude of the primary current 1411 increases with the output loading (e.g., the output current) as shown for $I_3 \leq I_{out} < I_4$ in FIG. 3(B).

In yet another example, if the control signal 475 (e.g., $V_p$) becomes larger than the threshold signal 463 (e.g., $V_{th\_max}$) in magnitude, the peak magnitude of the sensed signal 461 (e.g., $V_{cs}$ corresponding the waveform 550) is limited to the magnitude of the threshold signal 463 (e.g., $V_{th\_max}$ corresponding to the waveform 554). For example, both the on-time of the switch 1420 (e.g., $T_{on}$) and the peak magnitude of the primary current 1411 remains constant regardless of the output loading (e.g., the output current) as shown for $I_4 \leq I_{out} < I_6$ in FIG. 3(B).

As discussed above and further emphasized here, FIG. 4 is merely an example, which should not unduly limit the scope of the claims. One of ordinary skill in the art would recognize many variations, alternatives, and modifications. For example, the bipolar transistor 1420 is replaced by a MOS transistor as shown in FIG. 6.

FIG. 6 is a simplified diagram showing a power conversion system that adjusts switching frequency and peak current in response to output current according to another embodiment of the present invention. This diagram is merely an example, which should not unduly limit the scope of the claims. One of ordinary skill in the art would recognize many variations, alternatives, and modifications.

The power conversion system 600 includes a primary winding 1610, a secondary winding 1612, an auxiliary winding 1614, a switch 1620 (e.g., a MOS transistor), a current sensing resistor 1630, an equivalent resistor 1640 for an output cable, resistors 1650 and 1652, and a rectifying diode 1660. Additionally, the power conversion system 600 also includes a demagnetization detector 620, a sampling controller 622, a sampling switch 624, a capacitor 626, an oscillator 628, an error amplifier 630, an exponential generator 640, a comparator 650, a flip-flop component 652, a gate driver 654, comparators 660, 662, and 664, a logic component 666, resistors 670 and 672, and a capacitor 674.

For example, the primary winding 1610, the secondary winding 1612, the auxiliary winding 1614, the switch 1620, the current sensing resistor 1630, the equivalent resistor 1640, the resistors 1650 and 1652, and the rectifying diode 1660 are the same as the primary winding 110, the secondary winding 112, the auxiliary winding 114, the switch 120, the current sensing resistor 130, the equivalent resistor 140, the resistors 150 and 152, and the rectifying diode 160, respectively. In another example, the demagnetization detector 620, the sampling controller 622, the sampling switch 624, the capacitor 626, the oscillator 628, the error amplifier 630, the exponential generator 640, the comparator 650, the flip-flop component 652, the gate driver 654, the comparators 660, 662, and 664, the logic component 666, the resistors 670 and 672, and the capacitor 674 are located on a chip 610. In yet another example, the chip 610 includes terminals 612, 614, and 616.

In yet another example, the demagnetization detector 620, the sampling controller 622, the sampling switch 624, the capacitor 626, the oscillator 628, the error amplifier 630, the exponential generator 640, the comparator 650, the flip-flop component 652, the gate driver 654, the comparators 660, 662, and 664, the logic component 666, the resistors 670 and 672, and the capacitor 674 are similar to the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, and the capacitor 474, respectively, except that certain modifications are made in order to drive a MOS transistor instead of a bipolar transistor.

FIG. 7 is a simplified diagram showing a power conversion system that adjusts switching frequency and peak current in response to output current with voltage compensation according to yet another embodiment of the present invention. This diagram is merely an example, which should not unduly limit the scope of the claims. One of ordinary skill in the art would recognize many variations, alternatives, and modifications.

The power conversion system 700 includes the primary winding 1410, the secondary winding 1412, the auxiliary winding 1414, the switch 1420 (e.g., a bipolar transistor), the current sensing resistor 1430, the equivalent resistor 1440 for the output cable, the resistors 1450 and 1452, and the rectifying diode 1460. Additionally, the power conversion system 700 also includes the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, and the capacitor 474. Moreover, the power conversion system 700 also includes a frequency determination component 720, a frequency-to-current converter 730, and a current generation component 740.

For example, the demagnetization detector 420, the sampling controller 422, the sampling switch 424, the capacitor 426, the oscillator 428, the error amplifier 430, the exponential generator 440, the comparator 450, the flip-flop component 452, the gate driver 454, the comparators 460, 462, and 464, the logic component 466, the resistors 470 and 472, the capacitor 474, the frequency determination component 720, the frequency-to-current converter 730, and the current generation component 740 are located on a chip 710. In another example, the chip 710 includes terminals 712, 714, and 716. In yet another example, the frequency determination component 720, the frequency-to-current converter 730, and the current generation component 740 are parts of a compensation current generator.

According to one embodiment, the switching frequency increases with the output loading (e.g., the output current) and thus reflects the magnitude of the output loading (e.g., the magnitude of the output current) for at least $I_2 \leq I_{out} < I_5$ as shown in FIG. 3(A). For example, the frequency determination component 720 receives the output signal of the flip-flop component 452, which is also received by the gate driver 454, and generates a frequency signal 721 that represents the magnitude of the switching frequency. In another example, the frequency signal 721 is received by the frequency-to-current converter 730 and is converted to a current signal 731. In yet another example, the current generation component 740 receives the current signal 731 and in response generates a compensation current 741 (e.g., $I_{comp}$). In yet another example, the current generation component 740 also includes a low-pass filter to smooth out the compensation current 741 (e.g., $I_{comp}$).

According to another embodiment, the compensation current 741 (e.g., $I_{comp}$) flows out of the chip 710 through the terminal 716, and generates a compensation voltage as follows:

$$V_{comp} = \frac{R_1 \times R_2}{R_1 + R_2} \times I_{comp} \qquad \text{(Equation 6)}$$

where $V_{comp}$ represents the compensation voltage, and $I_{comp}$ represents the where $V_{comp}$ compensation current 741. Additionally, $R_1$ and $R_2$ represent resistance values of the resistors 1450 and 1452, respectively. For example, the compensation voltage is used to compensate for the voltage-drop due to the output cable (which is represented by the equivalent resistor 1440), and is also compensated for the output-voltage error due to cross regulation of the secondary winding and the auxiliary winding at no load and light load conditions. In another example, the compensation voltage is used to adjust the feedback signal 1455.

FIG. 8 is a simplified diagram showing a compensation current generator for the power conversion system 700 according to an embodiment of the present invention. This diagram is merely an example, which should not unduly limit the scope of the claims. One of ordinary skill in the art would recognize many variations, alternatives, and modifications.

The compensation current generator includes the comparators 1110 and 1112, the flip-flop component 1120, the signal generator 1130, the flip-flop components 1140, the encoding component 1150, the AND gate 1160, the switches 1170, the current sinks 1172, and the current source 1174. Additionally, the compensation current generator also includes transistors 1280, 1282, 1284, and 1286, a resistor 1290, and a capacitor 1292. U.S. patent application Ser. No. 12/859,138 is incorporated by reference herein for all purposes.

As shown in FIG. 8, the compensation current 741 that is dependent on the switching frequency is generated according to one embodiment. For example, since higher switching frequencies correspond to heavier loading conditions (e.g., larger output currents), and lower switching frequencies correspond to no load or light load conditions (e.g., smaller output currents); a larger compensation current is generated for lower switching frequency and a smaller compensation current is generated for higher switching frequency. In another example, the compensation current 741 is smoothed out by a low-pass filter that is formed by the resistor 1290 and the capacitor 1292. In yet another example, the compensation current 741 flows out of the chip 710 through the terminal 716, and together with the resistors 1450 and 1452 generates the compensation voltage (e.g., $V_{comp}$) that is superimposed with the feedback signal.

As discussed above and further emphasized here, FIG. 7 is merely an example, which should not unduly limit the scope of the claims. One of ordinary skill in the art would recognize many variations, alternatives, and modifications. For example, the bipolar transistor 1420 is replaced by a MOS transistor, and one or more components of the power conversion system 700 are modified in order to drive the MOS transistor instead of a bipolar transistor.

FIG. 9 is a simplified diagram showing a power conversion system that adjusts switching frequency and peak current in response to output current with offset modulation current according to yet another embodiment of the present invention. This diagram is merely an example, which should not unduly limit the scope of the claims. One of ordinary skill in the art would recognize many variations, alternatives, and modifications.

The power conversion system 900 includes a primary winding 1910, a secondary winding 1912, an auxiliary winding 1914, a switch 1920 (e.g., a bipolar transistor), a current sensing resistor 1930, an equivalent resistor 1940 for an output cable, resistors 1950 and 1952, and a rectifying diode 1960. Additionally, the power conversion system 900 also includes the demagnetization detector 920, the sampling controller 922, the sampling switch 924, the capacitor 926, the oscillator 928, the error amplifier 930, the exponential generator 940, the comparator 950, the flip-flop component 952, and the gate driver 954. Moreover, the power conversion system 900 also includes a frequency determination component 1720, a frequency-to-current converter 1730, and a current generation component 1740. Also, the power conversion system 900 includes a comparator 960, a frequency-to-current converter 1750, a current generation component 1760, and a resistor 1932.

For example, the primary winding 1910, the secondary winding 1912, the auxiliary winding 1914, the switch 1920, the current sensing resistor 1930, the equivalent resistor 1940, the resistors 1950 and 1952, and the rectifying diode 1960 are the same as the primary winding 110, the secondary winding 112, the auxiliary winding 114, the switch 120, the current sensing resistor 130, the equivalent resistor 140, the resistors 150 and 152, and the rectifying diode 160, respectively. In another example, the demagnetization detector 920, the sampling controller 922, the sampling switch 924, the capacitor 926, the oscillator 928, the error amplifier 930, the exponential generator 940, the comparator 950, the flip-flop component 952, the gate driver 954, the frequency determination component 1720, the frequency-to-current converter 1730, the current generation component 1740, the comparator 960, the frequency-to-current converter 1750, and the current generation component 1760 are located on a chip 910. In another example, the chip 910 includes terminals 912, 914, and 916.

In yet another example, the demagnetization detector 920, the sampling controller 922, the sampling switch 924, the capacitor 926, the oscillator 928, the error amplifier 930, the exponential generator 940, the comparator 950, the flip-flop component 952, the gate driver 954, the frequency determination component 1720, the frequency-to-current converter 1730, and the current generation component 1740 are substantially the same as the demagnetization detector 420, the sampling controller 422, the sampling switch 424, the capacitor 426, the oscillator 428, the error amplifier 430, the exponential generator 440, the comparator 450, the flip-flop component 452, the gate driver 454, the frequency determination component 720, the frequency-to-current converter 730, and the current generation component 740, respectively.

According to one embodiment, the switching frequency increases with the output loading (e.g., the output current) and thus reflects the magnitude of the output loading (e.g., the magnitude of the output current) in at least region II of FIG. 3(A). For example, the frequency determination component 1720 receives the output signal of the flip-flop component 952, which is also received by the gate driver 954, and generates a frequency signal 1721 that represents the magnitude of the switching frequency. In another example, the frequency signal 1721 is received by the frequency-to-current converters 1730 and 1750 and is converted to current signals 1731 and 1751, respectively.

As shown in FIG. 9, the current generation component 1740 receives the current signal 1731 and in response generates a compensation current 1741 (e.g., $I_{comp}$), and the current generation component 1760 receives the current signal 1751 and in response generates an offset modulation current 1761 (e.g., $I_{offset}$) according to one embodiment. For example, the offset modulation current 1761 (e.g., $I_{offset}$) decreases with increasing switching frequency and thus also decreases with increasing output loading (e.g., with increasing output current).

According to another embodiment, the offset modulation current 1761 (e.g., $I_{offset}$) flows out of the chip 910 through the terminal 914, and generates an offset voltage as follows:

$$V_{offset} = R_c \times I_{offset} \quad \text{(Equation 7)}$$

where $V_{offset}$ represents the offset voltage, and $I_{offset}$ represents the offset modulation current 1761. Additionally, $R_c$ represent the resistance value of the resistor 1932.

For example, the offset voltage is used to adjust a sensed signal 963 (e.g., $V_{cs}$). In another example, using Equation 7, the peak magnitude of a primary current 1911 that flows through the primary winding 1912 is determined as follows:

$$I_{peak} = \frac{V_{th\_OC} - R_c \times I_{offset}}{R_s} \quad \text{(Equation 8)}$$

where $I_{peak}$ represents the peak magnitude of the primary current 1911, and $V_{th\_OC}$ represents the threshold signal 961. Additionally, $R_c$ represent the resistance value of the resistor 1932. For example, the offset modulation current 1761 (e.g., $I_{offset}$) decreases with increasing output loading (e.g., with increasing output current); hence the peak magnitude of the primary current 1911 increases with increasing output loading (e.g., with increasing output current) but cannot exceed $V_{th\_OC}/R_s$ according to Equation 8.

As shown in FIG. 9, the compensation current 1741 (e.g., $I_{comp}$) is generated by at least the frequency-to-current converter 1730 and the current generation component 1740, and the offset modulation current 1761 (e.g., $I_{offset}$) is generated by at least the frequency-to-current converter 1750 and the current generation component 1760 according to some embodiments. For example, the compensation current 1741 (e.g., $I_{comp}$) and the offset modulation current 1761 (e.g., $I_{offset}$) are different and separate, even though both the currents 1741 and 1761 are derived from the frequency signal 1721 that is generated by the frequency determination component 1720.

As discussed above and further emphasized here, FIG. 9 is merely an example, which should not unduly limit the scope of the claims. One of ordinary skill in the art would recognize many variations, alternatives, and modifications. For example, the bipolar transistor 1920 is replaced by a MOS transistor, and one or more components of the power conversion system 900 are modified in order to drive the MOS transistor instead of a bipolar transistor. In another example, the current generation components 1740 and 1760 each include a low-pass filter. In yet another example, the current generation components 1740 and 1760 share a low-pass filter that is used to smooth out both the compensation current 1741 (e.g., $I_{comp}$) and the offset modulation current 1761 (e.g., $I_{offset}$).

According to another embodiment, a system for regulating a power converter includes a comparator configured to receive a first signal and a second signal and generate a comparison signal based on at least information associated with the first signal and the second signal. The first signal is associated with at least an output current of a power converter. Additionally, the system includes a pulse-width-modulation generator configured to receive at least the comparison signal and generate a modulation signal based on at least information associated with the comparison signal, and a driver component configured to receive the modulation signal and output a drive signal to a switch to adjust a primary current flowing through a primary winding of the power converter. The modulation signal is associated with a modulation frequency corresponding to a modulation period. The modulation frequency increases with the output current at a first slope within a first current range, the modulation frequency increases with the output current at a second slope within a second current range, and the modulation frequency increases with the output current at a third slope within a third current range. The first current range and the third current range are separated by at least the second current range, and each of the first slope, the second slope, and the third slope is larger than zero. The primary current is associated with a peak magnitude for each modulation period. The peak magnitude remains constant or increases with respect to the output current at a fourth slope within a fourth current range, and the fourth slope is equal to or larger than zero. The peak magnitude increases with the output current at a fifth slope within a fifth current range, and the fifth slope is larger than zero. The peak magnitude remains constant or increases with respect to the output current at a sixth slope within a sixth current range, and the sixth slope is equal to or larger than zero. The fourth current range and the sixth current range are separated by at least the fifth current range. For example, the system is implemented according to FIG. 4, FIG. 6, FIG. 7, and/or FIG. 9.

According to another embodiment, a method for regulating a power converter includes receiving a first signal and a second signal. The first signal is associated with at least an output current of a power converter. Additionally, the method includes processing information associated with the first signal and the second signal, generating a comparison signal based on at least information associated with the first signal and the second signal, receiving at least the comparison signal, and generating a modulation signal based on at least information associated with the comparison signal. Moreover, the method includes receiving the modulation signal, and outputting a drive signal based on at least at least information associated with the modulation signal to adjust a primary current flowing through a primary winding of the power converter. The modulation signal is associated with a modulation frequency corresponding to a modulation period. The modulation frequency increases with the output current at a first slope within a first current range, the modulation frequency increases with the output current at a second slope within a second current range, and the modulation frequency increases with the output current at a third slope within a third current range. The first current range and the third current range are separated by at least the second current range, and each of the first slope, the second slope, and the third slope is larger than zero. The primary current is associated with a peak magnitude for each modulation period. The peak magnitude remains constant or increases with respect to the output current at a fourth slope within a fourth current range, and the fourth slope is equal to or larger than zero. The peak magnitude increases with the output current at a fifth slope within a fifth current range, and the fifth slope is larger than zero. The peak magnitude remains constant or increases with respect to the output current at a sixth slope within a sixth current range, and the sixth slope is equal to or larger than zero. The fourth current range and the sixth current range are separated by at least the fifth current range. For example, the method is implemented according to FIG. 4, FIG. 6, FIG. 7, and/or FIG. 9.

According to yet another embodiment, a system for regulating a power converter includes a first comparator configured to receive a first signal and a second signal and generate a first comparison signal based on at least information associated with the first signal and the second signal. The first signal is associated with at least an output current of a power converter. Additionally, the system includes a second comparator configured to receive a third signal and a fourth signal and generate a second comparison signal based on at least information associated with the third signal and the fourth signal. The third signal is related to the second signal, and the fourth signal is associated with a primary current flowing through a primary winding of the power converter. Moreover, the system includes a logic component configured to receive at least the second comparison signal and generate a logic signal based on at least information associated with the second comparison signal, a pulse-width-modulation generator configured to receive at least the first comparison signal and the logic signal and generate a modulation signal based on at least information associated with the first comparison signal and the logic signal, and a driver component configured to receive the modulation signal and output a drive signal to a switch to adjust the primary current. For example, the system is implemented according to FIG. 4, FIG. 6, and/or FIG. 7.

According to yet another embodiment, a method for regulating a power converter includes receiving a first signal and a second signal, and the first signal is associated with at least an output current of a power converter. Additionally, the method includes processing information associated with the first signal and the second signal, generating a first comparison signal based on at least information associated with the first signal and the second signal, and receiving a third signal and a fourth signal, the third signal being related to the second signal. The fourth signal is associated with a primary current flowing through a primary winding of the power converter. Moreover, the method includes processing information associated with the third signal and the fourth signal, generating a second comparison signal based on at least information associated with the third signal and the fourth signal, receiving at least the second comparison signal, processing information associated with the second comparison signal, and generating a logic signal based on at least information associated with the second comparison signal. Also, the method includes receiving at least the first comparison signal and the logic signal, generating a modulation signal based on at least information associated with the first comparison signal and the logic signal, receiving the modulation signal, and outputting a drive signal based on at least information associated with the modulation signal to adjust the primary current. For example, the method is implemented according to FIG. 4, FIG. 6, and/or FIG. 7.

According to yet another embodiment, a system for regulating a power converter includes a first comparator configured to receive a first signal and a second signal and generate a first comparison signal based on at least information associated with the first signal and the second signal, and the first signal is associated with at least an output current of a power converter. Additionally, the system includes a second comparator configured to receive a third signal and a fourth signal and generate a second comparison signal based on at least information associated with the third signal and the fourth signal. The third signal is related to the second signal, and the fourth signal is associated with a primary current flowing through a primary winding of the power converter. Moreover, the system includes a logic component configured to receive at least the second comparison signal and generate a logic signal based on at least information associated with the second comparison signal, and a pulse-width-modulation generator configured to receive at least the first comparison signal and the logic signal and generate a modulation signal based on at least information associated with the first comparison signal and the logic signal. The modulation signal is associated with a modulation frequency. Also, the system includes a driver component configured to receive the modulation signal and output a drive signal to a switch to adjust the primary current. Also, the system includes a first current generator configured to receive the modulation signal and output a compensation current based on at least information associated with the modulation frequency to generate a compensation voltage and adjust the first signal, and a second current generator configured to receive the modulation signal associated with the modulation frequency and output an offset current based on at least information associated with the modulation frequency to generate an offset voltage and adjust the fourth signal. For example, the system is implemented according to FIG. 9.

According to yet another embodiment, a method for regulating a power converter includes receiving a first signal and a second signal. The first signal is associated with at least an output current of a power converter. Additionally, the method includes processing information associated with the first signal and the second signal, generating a first comparison signal based on at least information associated with the first signal and the second signal, and receiving a third signal and a fourth signal, the third signal being related to the second signal. The fourth signal is associated with a primary current flowing through a primary winding of the power converter. Moreover, the method includes processing information associated with the third signal and the fourth signal, generating a second comparison signal based on at least information associated with the third signal and the fourth signal, receiving at least the second comparison signal, processing information associated with the second comparison signal, and generating a logic signal based on at least information associated with the second comparison signal. Also, the method includes receiving at least the first comparison signal and the logic signal, and generating a modulation signal based on at least information associated with the first comparison signal and the logic signal. The modulation signal is associated with a modulation frequency. Additionally, the method includes receiving the modulation signal, outputting a drive signal based on at least information associated with the modulation signal to adjust the primary current, outputting a compensation current based on at least information associated with the modulation frequency to generate a compensation voltage and adjust the first signal, and outputting an offset current based on at least information associated with the modulation frequency to generate an offset voltage and adjust the fourth signal. For example, the method is implemented according to FIG. 9.

Referring back to FIG. 7, the switching frequency (e.g., $F_{sw}$) is increased under no load or light load conditions (e.g., smaller output currents) in order to increase the output voltage on the secondary side to a proper level if the output load changes from no load or light load to full load (e.g., the output current changing to 1 A at full load). But, in some situations, the change of output load may cause the output voltage on the secondary side to drop rapidly, while the switching frequency is adjusted only after a delay in response to the rapid decrease of the output voltage, according to some embodiments.

FIG. 10 is a simplified timing diagram for the switch-mode power conversion system 700 according to another embodiment of the present invention. This diagram is merely an example, which should not unduly limit the scope of the claims. One of ordinary skill in the art would recognize many variations, alternatives, and modifications. The waveform 1002 represents the output voltage on the secondary side as a function of time, and the waveform 1004 represents turned-on and turned-off conditions of the switch 1420 as a function of time. For example, if the waveform 1004 is at a logic high level, the switch 1420 is closed (e.g., being turned on), and if the waveform 1004 is at a logic low level, the switch 1420 is open (e.g., being turned off).

Three time periods $T_A$, $T_B$, and $T_C$ are shown in FIG. 10. The time period $T_A$ starts at time $t_0$ and ends at time $t_1$, the time period $T_B$ starts at time $t_1$ and ends at time $t_4$, and the time period $T_C$ starts at time $t_4$ and ends at time $t_6$. For example, the times $t_2$ and $t_3$ are within the time period $T_B$, and the time $t_5$ is within the time period $T_C$. In another example, $t_0 \le t_1 \le t_2 \le t_3 \le t_4 \le t_5 \le t_6$.

In one embodiment, during the time period $T_A$, the power conversion system 700 has light output load or no output load, and there is no change in output load. For example, the output voltage remains constant (e.g., the magnitude 1006 as shown by waveform 1002). In another example, there is no need to adjust the switching frequency or the peak current of the primary winding, and the switch 1420 has a constant switching period 1010 (e.g., $T_0$ as shown in the waveform 1004).

In another embodiment, at the beginning of the time period $T_B$, the output load changes from no load or light load to full load. For example, the output voltage starts to drop rapidly from the magnitude 1006 (e.g., at $t_1$), but the feedback signal 1455 is not sampled again until $t_2$. Hence, the drop of output voltage may not be detected before $t_2$ according to some embodiments.

According to one embodiment, the delay in detecting the drop of output voltage may last longer due to the compensation voltage. For example, the compensation current 741 flows through the terminal 716, and generates a voltage offset which affects the feedback signal 1455 as follows:

$$V_{FB} = \frac{R_2}{R_1 + R_2} \times V_{aux} + I_{comp} \times \frac{R_1 R_2}{R_1 + R_2} \qquad \text{(Equation 9)}$$

where $V_{FB}$ represents the feedback signal 1455, and $V_{aux}$ represents the voltage of the auxiliary winding 1414. Additionally, $I_{comp}$ represents the compensation current 741. $R_1$ and $R_2$ represent the resistance values of the resistors 1450 and 1452, respectively. As shown in Equation 9, although $V_{aux}$ reflects the output voltage on the secondary side, $V_{FB}$ often does not precisely represent the output voltage on the secondary side due to $I_{comp}$, according to certain embodiments.

For example, during the time period $T_B$, the magnitude of the sampled feedback signal 1455 (e.g., $V_{FB}$) may not change much despite the rapid drop of the output voltage, and it may remain larger than the reference voltage (e.g., $V_{ref}$). Hence, the amplified signal (e.g., $V_{ea}$) does not change much, and in turn, the switching frequency of the switch 1420 is not adjusted rapidly, according to some embodiments. In another example, the compensation current 741 responds to the change in output load slowly to ensure the stability of the output on the secondary side. Hence, the rapid drop of the output voltage may not be detected by monitoring the magnitude of the feedback signal 1455 (e.g., $V_{FB}$) alone during the time period $T_B$, according to certain embodiments.

According to another embodiment, as shown in FIG. 10, when the magnitude of the feedback signal 1455 drops to a certain degree in response to the rapid change of the output voltage, the switching frequency and the peak current of the primary winding may finally be adjusted. For example, at the beginning of the time period $T_C$, the switching period of the switch 1420 decreases from the period 1010 to a period 1014 (e.g., $T_1$) that corresponds to an increased switching frequency. In another example, in response, the output voltage begins to increase after dropping to a minimum magnitude 1016 (e.g., at the time $t_5$), and continues to increase to a magnitude 1012 (e.g., at $t_6$).

According to yet another embodiment, the switching frequency is increased after a delay in response to the rapid decrease of the output voltage. For example, the delay includes at least the time period $T_B$, which equals several original switching periods (e.g., three switching periods). Hence, a scheme to reduce the delay in order to dynamically adjust the switching frequency and the peak current of the primary winding is desired.

FIG. 11 is a simplified diagram showing certain components of a power conversion system that dynamically adjusts switching frequency and peak current in response to output current according to yet another embodiment of the present invention. This diagram is merely an example, which should not unduly limit the scope of the claims. One of ordinary skill in the art would recognize many variations, alternatives, and modifications.

The power conversion system 1100 includes the resistors 1450 and 1452 on the auxiliary side. Additionally, the power conversion system 1100 includes a sampling switch 1502, a capacitor 1504, a buffer 1506, an error amplifier 1508, an exponential generator 1510, a demagnetization detector 1512, an oscillator 1514, a comparator 1516, a flip-flop component 1518, a gate driver 1520, a cable drop compensation component 1522, a logic component 1524, comparators 1526, 1528, and 1530, a voltage-change-rate detection component 1532 (e.g., a slope detection component), a dynamic-enhancement logic-control component 1534, resistors 1536 and 1538, a capacitor 1540, a NOT gate 1594, a NAND gate 1590, and an AND gate 1598.

For example, the sampling switch 1502, the capacitor 1504, the buffer 1506, the error amplifier 1508, the exponential generator 1510, the demagnetization detector 1512, the oscillator 1514, the comparator 1516, the flip-flop component 1518, the gate driver 1520, the cable drop compensation component 1522, the logic component 1524, the comparators 1526, 1528, and 1530, the voltage-change-rate detection component 1532, the dynamic-enhancement logic-control component 1534, the resistors 1536 and 1538, the capacitor 1540, the NOT gate 1594, the NAND gate 1590, and the AND gate 1598 are located on a chip 1102. In another example, the chip 1102 includes terminals 1542, 1544, and 1546.

According to one embodiment, the sampling switch 1502, the capacitor 1504, the error amplifier 1508, the exponential generator 1510, the demagnetization detector 1512, the oscillator 1514, the comparator 1516, the flip-flop component 1518, the gate driver 1520, the logic component 1524, the comparators 1526, 1528 and 1530, the resistors 1536 and 1538, and the capacitor 1540 are substantially the same as the sampling switch 424, the capacitor 426, the error amplifier 430, the exponential generator 440, the demagnetization detector 420, the oscillator 428, the comparator 450, the flip-flop component 452, the gate driver 454, the logic component 466, the comparators 460, 464 and 462, the resistors 470 and 472, and the capacitor 474, respectively. In yet another example, the cable drop compensation component 1522 includes the frequency determination component 720, the frequency-to-current converter 730, and the current generation component 740. In yet another example, the terminals 1542, 1544 and 1546 are the same as the terminals 712, 714 and 716, respectively. In yet another example, the power conversion system 1100 includes the primary winding 1410, the secondary winding 1412, the auxiliary winding 1414, the switch 1420, and the current sensing resistor 1430.

Information about the output voltage is extracted through the auxiliary winding 1414 according to another embodiment. For example, the feedback signal 1455 (e.g., $V_{FB}$) is generated at the node 1454 as shown in FIG. 11. In another example, the feedback signal 1455 is received by at least the demagnetization detector 1512, the sampling switch 1502, and the voltage-change-rate detection component 1532.

In response to the received feedback signal 1455, the demagnetization detector 1512 outputs a signal 1562 to the exponential generator 1510 according to yet another embodiment. For example, the exponential generator 1510 generates a ramping signal 1566 (e.g., $V_{ramp}$) as follows:

$$V_{ramp}(n) = (V_{refb} - V_{refa}) \times e^{-\left(\frac{n \times T}{\tau}\right)} + V_{refa} \qquad \text{(Equation 10)}$$

where $V_{ramp}$ represents the voltage magnitude of the ramping signal 1566. Additionally, $V_{refa}$ and $V_{refb}$ each represent a constant voltage level. For example, $V_{refa}$ equals 1V, and $V_{refb}$ equals 3V. Moreover, n represents the time for the ramping signal 1566 to fall from $V_{refb}$ since the last reset of the ramping signal 1566 in terms of the number of the clock periods. T is the clock period of a clock signal 1558 from the oscillator 1514. Furthermore, $\tau$ is the time constant.

According to another embodiment, when the switch 1420 is open (e.g., being turned off), the energy stored in the transformer is released to the output terminal. For example, the demagnetization process starts, and the current flowing through the secondary winding 1412 ramps down linearly. In another example, when the demagnetization process almost ends, the current flowing through the secondary winding 1412 approaches zero, the sampling switch 1502 receives a sampling signal (e.g., a pulse signal) and is closed to sample the feedback signal 1455. In yet another example, after the sampling process is completed, the sampling switch 1502 is open. In yet another example, the sampled voltage is held on the capacitor 1504, and compared with a reference voltage $V_{ref}$ (e.g., 2V).

The difference between the sampled/held voltage and the reference voltage $V_{ref}$ is amplified by the error amplifier 1508 to generate the amplified error signal 1584 (e.g., $V_{ea}$) according to an embodiment. For example, the amplified error signal 1584 is received by the resistor 1536 and a negative input terminal of the comparator 1516. In another example, the resistor 1536, together with the resistor 1538 and the capacitor 1540, outputs a control signal 1586 to the comparator 1526. In yet another example, the resistors 1536 and 1538 and the capacitor 1540 form a compensation network, which perform attenuation and low-pass filtering to the amplified error signal 1584 and generates the control signal 1586.

According to another embodiment, the comparator 1516 also receives the ramping signal 1566 (e.g., $V_{ramp}$) at a positive input terminal, and in response sends an output signal 1588 to the NAND gate 1590. For example, the NAND gate 1590 also receives an inverted gate signal 1592 generated by the NOT gate 1594. In another example, the AND gate 1598 receives an output signal 1593 from the NAND gate 1590 and a clock signal 1595 (e.g., Timer_CC), and generates an output signal 1597 to the flip-flop component 1518.

In one embodiment, a primary current 1411 that flows through the primary winding 1410 is sensed by the current sensing resistor 1430, which in response outputs a sensed signal 1564 (e.g., $V_{cs}$) to the comparators 1526, 1528, and 1530. For example, if the switch 1420 is closed (e.g., being turned on), the transformer stores energy and the primary current 1411 ramps up linearly, causing the sensed signal 1564 (e.g., $V_{cs}$) to also ramp up linearly. In another example, the positive terminal of the comparator 1526 receives the control signal 1586, and the negative terminal of the comparator 1526 receives the sensed signal 1564. In yet another example, the positive terminal of the comparator 1530 receives a threshold signal 1531 (e.g., $V_{th\_max}$), and the negative terminal of the comparator 1530 receives the sensed signal 1564. In yet another example, the negative terminal of the comparator 1528 receives the sensed signal 1564, and the positive terminal of the comparator 1528 receives a threshold signal 1529 (e.g., $V_{th\_min}$ which is smaller than $V_{th\_max}$ in magnitude).

In another embodiment, the comparators 1526, 1528, and 1530 generate comparison signals 1521, 1523, and 1525 respectively, all of which are received by the logic component 1524. For example, the logic component 1524 in response generates a logic signal 1574.

According to one embodiment, the flip-flop component 1518 receives the output signal 1597 of the AND gate 1598 and the logic signal 1574 from the logic component 1524. For example, the flip-flop component 1518 generates in response a signal 1599. In another example, the signal 1599 is received by the gate driver 1520 which outputs a drive signal 1527 to the switch 1420 through the terminal 1542 (e.g., outputting a base current to the bipolar transistor 1420 through the terminal 1542). In yet another example, if the signal 1599 is at the logic high level, the drive signal 1527 causes the switch 1420 to be closed (e.g., being turned on). In yet another example, if the signal 1599 is at the logic low level, the drive signal 1527 causes the switch 1420 to be open (e.g., being turned off).

According to another embodiment, the larger the output loading (e.g., the output current) is, the larger the amplified error signal 1584 (e.g., $V_{ea}$) becomes, causing the off-time (e.g., $T_{off}$) of the switch 1420 to become shorter and the switching frequency (e.g., $F_{sw}$) to become higher according to one embodiment. According to yet another embodiment, the smaller the output loading (e.g., the output current) is, the smaller the amplified error signal 1584 (e.g., $V_{ea}$) becomes, causing the off-time (e.g., $T_{off}$) of the switch 1420 to become longer and the switching frequency (e.g., $F_{sw}$) to become lower.

According to yet another embodiment, the logic component 1524 includes an OR gate and other components. For example, if the control signal 1586 is smaller than the threshold signal 1529 (e.g., $V_{th\_min}$) in magnitude, the peak magnitude of the sensed signal 1564 (e.g., $V_{cs}$) is limited to the magnitude of the threshold signal 1529 (e.g., $V_{th\_min}$), and the on-time of the switch 1420 (e.g., $T_{on}$) and the peak magnitude of the primary current 1411 remains constant regardless of the output loading (e.g., the output current).

In another example, if the control signal 1586 is larger than the threshold signal 1529 (e.g., $V_{th\_min}$) but smaller than the threshold signal 1531 (e.g., $V_{th\_max}$) in magnitude, the peak magnitude of the sensed signal 1564 (e.g., $V_{cs}$) is limited to the magnitude of the control signal 1586. For example, the control signal 1586 increases with the output loading (e.g., the output current) in magnitude; hence both the on-time of the switch 1420 (e.g., $T_{on}$) and the peak magnitude of the primary current 1411 increases with the output loading (e.g., the output current).

In yet another example, if the control signal 1586 becomes larger than the threshold signal 1531 (e.g., $V_{th\_max}$) in magnitude, the peak magnitude of the sensed signal 1564 (e.g., $V_{cs}$) is limited to the magnitude of the threshold signal 1531 (e.g., $V_{th\_max}$). For example, both the on-time of the switch 1420 (e.g., $T_{on}$) and the peak magnitude of the primary current 1411 remains constant regardless of the output loading (e.g., the output current).

According to yet another embodiment, as shown in FIG. 11, the cable drop compensation component 1522 receives the output signal 1588 of the comparator 1516, the clock signal 1558 of the oscillator 1514, and an output signal 1552 of the dynamic-enhancement logic-control component 1534. In response, the cable drop compensation component 1522 generates a compensation current 1548 (e.g., $I_{comp}$) according to yet another embodiment. For example, the compensation current 1548 (e.g., $I_{comp}$) flows out of the chip 1102 through the terminal 1546, and generates a compensation voltage as follows:

$$V_{comp} = \frac{R_1 \times R_2}{R_1 + R_2} \times I_{comp} \quad \text{(Equation 11)}$$

where $V_{comp}$ represents the compensation voltage, and $I_{comp}$ represents the compensation current 1548. Additionally, $R_1$ and $R_2$ represent resistance values of the resistors 1450 and 1452, respectively. For example, the compensation voltage is used to compensate for the voltage-drop due to the output cable on the secondary side, and is also compensated for the output-voltage error due to cross regulation of the secondary winding and the auxiliary winding at no load and light load conditions. In another example, the compensation voltage is used to adjust the feedback signal 1455.

According to yet another embodiment, the voltage-change-rate detection component 1532 samples the feedback signal 1455 during a particular switching period of the switch 1420, and compares the currently sampled feedback signal with a previously sampled feedback signal during a previous switching period. For example, based on the comparison, the voltage-change-rate detection component 1532 then outputs a signal 1550 to the dynamic-enhancement logic-control component 1534. In another example, the signal 1550 includes one or more sub-signals. According to yet another embodiment, the dynamic-enhancement logic-control component 1534 in response generates output signals 1552, 1554 and 1556, which are provided as additional input signals to the cable drop compensation component 1522, the exponential generator 1510, and the logic component 1524, respectively.

For example, the output signal 1552 is provided for adjusting the compensation current 1548 (e.g., $I_{comp}$) generated by the cable drop compensation component 1522. In another example, the output signal 1554 is provided for changing the ramping signal 1566 (e.g., $V_{ramp}$) generated by the exponential generator 1510 in order to adjust the switching frequency. In yet another example, the output signal 1556 is provided to the logic component 1524 to adjust the peak current of the primary winding.

FIG. 12 is a simplified flow diagram showing dynamic adjustment of the switching frequency and the peak current of the primary winding in the power conversion system 1100 according to one embodiment of the present invention. This diagram is merely an example, which should not unduly limit the scope of the claims. One of ordinary skill in the art would recognize many variations, alternatives, and modifications.

The process for dynamically adjusting the switching frequency and the peak current includes at least a process 1204 for sampling feedback signal, a process 1206 for calculating demagnetization period, a process 1208 for storing sampled feedback signal, a process 1210 for subtracting previously sampled signal by currently sampled signal, a process 1212 for increasing peak current and switching frequency, a process 1214 for subtracting currently sampled signal by previously sampled signal, a process 1216 for decreasing peak current and switching frequency, a process 1218 for determining peak current and switching frequency, and a process 1220 for determining pulse width and generating drive signal.

At the process 1204, the feedback signal 1455 is sampled during a current switching period (e.g., T(n)) by the voltage-change-rate detection component 1532 to generate a currently sampled signal (e.g., X(n)), according to one embodiment. At the process 1206, a demagnetization period is calculated based on at least information associated with the currently sampled feedback signal (e.g., X(n)), according to another embodiment. At the process 1208, the currently sampled feedback signal is stored in at least one or more components of the voltage-change-rate detection component 1532, according to yet another embodiment.

At the process 1210, the currently sampled feedback signal (e.g., X(n)) is used to subtract a previously sampled feedback signal (e.g., X(n−1)) during a previous switching period (e.g., T(n−1)) in the voltage-change-rate detection component 1532, according to yet another embodiment. For example, if the previously sampled signal (e.g., X(n−1)) subtracted by the currently sampled signal (e.g., X(n)) exceeds a first threshold voltage (e.g., $V_{th1}$), the process 1212 is performed. In another example, if the previously sampled signal (e.g., X(n−1)) subtracted by the currently sampled signal (e.g., X(n)) does not exceed the first threshold voltage (e.g., $V_{th1}$), the process 1214 is performed. In yet another example, the first threshold voltage is larger than or equal to zero.

At the process 1212, the peak current and the switching frequency are increased according to yet another embodiment. For example, the voltage-change-rate detection component 1532 outputs the signal 1550 to the dynamic-enhancement logic-control component 1534. In another example, the dynamic-enhancement logic-control component 1534 in response outputs the signals 1554 and 1556 to increase the switching frequency and the peak current of the primary winding. In yet another example, the signal 1554 is provided to the exponential generator 1510 to change the ramping signal 1566 (e.g., $V_{ramp}$); hence, the off-time (e.g., $T_{off}$) of the switch 1420 is shortened and the switching frequency is increased. In yet another example, the signal 1556 is provided to the logic component 1524 in order to increase the peak current of the primary winding. In yet another example, the switching frequency and the peak current of the primary winding are increased to the maximum switching frequency and the maximum peak current, respectively. In yet another example, after the process 1212 is completed, the process 1220 is performed.

At the process 1214, the currently sampled feedback signal (e.g., X(n)) is subtracted by the previously sampled feedback signal (e.g., X(n−1)) during the previous switching period (e.g., T(n−1)) in the voltage-change-rate detection component 1532, according to yet another embodiment. For example, if the currently sampled signal (e.g., X(n)) subtracted by the previously sampled signal (e.g., X(n−1)) exceeds a second threshold voltage (e.g., $V_{th2}$), the process 1216 is performed. In another example, if the currently sampled signal (e.g., X(n)) subtracted by the previously sampled signal (e.g., X(n−1)) does not exceed the second threshold voltage (e.g., $V_{th2}$), the process 1218 is performed. In yet another example, the second threshold voltage (e.g., $V_{th2}$) is the same as or different from the first threshold voltage (e.g., $V_{th1}$). In yet another example, the second threshold voltage is larger than or equal to zero.

At the process 1216, the peak current and the switching frequency are decreased according to yet another embodiment. For example, the voltage-change-rate detection component 1532 outputs the signal 1550 to the dynamic-enhancement logic-control component 1506. In another example, the dynamic-enhancement logic-control component 1506 in response outputs the signals 1554 and 1556 to increase the switching frequency and the peak current of the primary winding. In yet another example, the signal 1554 is provided to the exponential generator 1510 to change the ramping signal 1566 (e.g., $V_{ramp}$); hence, the off-time (e.g., $T_{off}$) of the switch 1420 is lengthened and the switching frequency is decreases. In yet another example, the signal 1556 is provided to the logic component 1524 in order to decrease the peak current of the primary winding. In yet another example, the switching frequency and the peak current of the primary winding are decreased to the minimum switching frequency and the minimum peak current, respectively. In yet another example, after the process 1216 is completed, the process 1220 is performed.

At the process 1218, the peak current and the switching frequency (e.g., for the next switching period) are determined based on the amplified error signal 1584 (e.g., $V_{ea}$) according to yet another embodiment. After the process 1218 is completed, the process 1220 is performed. At the process 1220, the pulse width for the drive signal 1527 is determined and the drive signal 1527 is generated according to yet another embodiment.

As discussed above and further emphasized here, FIG. 12 is merely an example, which should not unduly limit the scope of the claims. One of ordinary skill in the art would recognize many variations, alternatives, and modifications. For example, the processes 1214 and 1216 are skipped. In another example, the processes 1210 and 1212 are skipped. In yet another example, the process 1206 is skipped. In yet another example, the process 1208 is skipped.

FIG. 13 is a simplified timing diagram for the switch-mode power conversion system 1100 with dynamic adjustment of the switching frequency and the peak current of the primary winding according to an embodiment of the present invention. This diagram is merely an example, which should not unduly limit the scope of the claims. One of ordinary skill in the art would recognize many variations, alternatives, and modifications.

As shown in FIG. 13, the waveform 1302 represents the output voltage on the secondary side as a function of time, the waveform 1304 represents the turned-on and turned-off conditions of the switch 1420 as a function of time, and the waveform 1306 represents a sensed signal (e.g., $V_{CS}$) as a function of time. Additionally, the waveform 1308 represents an output current on the secondary side as a function of time, and the waveform 1310 represents the signal 1550 or one sub-signal of the signal 1550 from the voltage-change-rate detection component 1532 as a function of time. Four time periods are shown in FIG. 13, including $T_D$, $T_E$, $T_F$, and $T_G$.

According to one embodiment, during the time period $T_D$, the power conversion system 1100 has light output load or no output load, and there is no change in output load. For example, the output voltage remains constant (e.g., at a magnitude 1316 as shown by the waveform 1302), and the output current also remains constant (e.g., at a magnitude 1322 as shown by the waveform 1308). In another example, the voltage-change-rate detection component 1532 does not detect any change that exceeds the first threshold voltage (e.g., $V_{th1}$) in the process 1210 or any change that exceeds the second threshold voltage (e.g., $V_{th2}$) in the process 1214, and therefore generates the signal 1550 or one sub-signal of the signal 1550 at a logic low level (e.g., as shown by the waveform 1310). In yet another example, in response to the signal 1550 or one sub-signal of the signal 1550 at the logic low level, neither the process 1212 nor the process 1216 is performed for the dynamic adjustment of the switching frequency or the peak current of the primary winding, during the time period $T_D$.

Also, during the time period $T_D$, the switch 1420 keeps a constant switching period 1312 (e.g., $T_2$ as shown in the waveform 1304) according to another embodiment. For example, the logic high level as shown in the waveform 1304 indicates that the switch 1420 is closed (e.g., being turned on), and the logic low level as shown in the waveform 1304 indicates that the switch 1420 is open (e.g., being turned off). Additionally, a primary current (e.g., the current 1411) that flows through the primary winding (e.g., the winding 1410) is sensed by a current sensing resistor (e.g., the resistor 1430), which in response outputs a sensed signal (e.g., $V_{CS}$ corresponding to the waveform 1306) according to yet another embodiment. For example, if the switch 1420 is closed (e.g., being turned on), the primary current ramps up linearly, causing the sensed signal to ramp up linearly to a magnitude 1326 as shown by the peaks in the waveform 1306 during the time period $T_D$.

In one embodiment, at the beginning of the time period $T_E$, the output load changes from no load or light load to full load. For example, in response, the output voltage drops rapidly (e.g., linearly or non-linearly) from the magnitude 1316 at the beginning of the period $T_E$ to the magnitude 1318 at the end of the time period $T_E$. Also, in another example, the output current increases quickly from the magnitude 1322 to the magnitude 1324 during the time period $T_E$.

In another embodiment, close to the end of the time period $T_E$, the switch 1420 is closed (e.g., as shown by a rising edge of the waveform 1304), and then the switch 1420 is open (e.g., as shown by a falling edge of the waveform 1304) and the demagnetization process starts. For example, when the demagnetization process almost ends, the feedback signal 1455 is currently sampled by the voltage-change-rate detection component 1532 at the process 1204. In another example, the currently sampled feedback signal is compared with a previously sampled feedback signal during a previous switching period at the process 1210. If the previously sampled feedback signal exceeds in magnitude the currently sampled feedback signal by no less than the first threshold voltage (e.g., $V_{th1}$), the rapid decrease of the output voltage is detected by the voltage-change-rate detection component 1532 according to certain embodiments. For example, consequently the signal 1550 or one sub-signal of the signal 1550 from the voltage-change-rate detection component 1532 changes from the logic low level to the logic high level at the beginning of the time period $T_F$ (as shown by a rising edge of the waveform 1310).

In response, during the time period $T_F$, the process 1212 is performed according to yet another embodiment. For example, the dynamic-enhancement logic-control component 1534 in response outputs the signals 1554 and 1556 to increase the switching frequency and the peak current of the primary winding. In another example, the switching frequency and the peak current of the primary winding are increased to the maximum switching frequency and the maximum peak current, respectively. In another example, the switching period of the switch 1420 drops from the period 1312 (e.g., $T_2$ as shown in the waveform 1304) to a period 1314 (e.g., $T_3$ as shown in the waveform 1304). In yet another example, the increase of the peak current of the primary winding causes the peaks of the sensed signal to increase (e.g., to a magnitude 1328 as shown in the waveform 1306).

Also, during the time period $T_F$, the output voltage recovers in response to the increase of the switching frequency and the peak current of the primary winding (e.g., as shown by the waveform 1302), according to yet another embodiment. For example, the output voltage increases from the magnitude 1318 at the beginning of the time period $T_F$ to a magnitude 1320, and then remains at the magnitude 1320 for the rest of the time period $T_F$. In yet another example, the magnitude 1320 is equal to the magnitude 1316. As shown in FIG. 13, the delay in adjusting the switching frequency and the peak current of the primary winding is approximately the time period $T_E$, which is much shorter than the original switching period 1312 (e.g., $T_2$) according to some embodiments. For example, in comparison with FIG. 10, the delay of adjustment has been reduced significantly.

In yet another embodiment, at the beginning of the time period $T_G$, the output voltage has remained at the magnitude 1320 for several switching periods (e.g., four switching periods). For example, the voltage-change-rate detection component 1532 changes the signal 1550 or one sub-signal of the signal 1550 from the logic high level to the logic low level (as shown by a falling edge of the waveform 1310). In response, at the process 1218, the dynamic-enhancement logic-control component 1534 outputs signals to decrease the switching frequency and the peak current of the primary winding according to one embodiment. For example, the switching period of the switch 1420 increases to a period 1330 (e.g., $T_4$ as shown in the waveform 1304). In another example, the decrease of the peak current of the primary current causes the peak of the sensed signal to drop to a magnitude 1332 as shown in the waveform 1306. In yet another example, during the time period $T_F$, the output voltage and the output current remain at the magnitude 1320 and the magnitude 1324, respectively.

FIG. 14 is a simplified diagram showing certain components of the power conversion system 1100 according to yet another embodiment of the present invention. This diagram is merely an example, which should not unduly limit the scope of the claims. One of ordinary skill in the art would recognize many variations, alternatives, and modifications.

The power conversion system 1100 includes the resistors 1450 and 1452 on the auxiliary side. Additionally, the power conversion system 1100 includes the sampling switch 1502, the capacitor 1504, the buffer 1506, the error amplifier 1508, the exponential generator 1510, the demagnetization detector 1512, the oscillator 1514, the comparator 1516, the flip-flop component 1518, the gate driver 1520, the cable drop compensation component 1522, the logic component 1524, the comparators 1526, 1528, and 1530, the voltage-change-rate detection component 1532, the dynamic-enhancement logic-control component 1534, the resistors 1536 and 1538, the capacitor 1540, the NOT gate 1594, the NAND gate 1590, and the AND gate 1598.

The voltage-change-rate detection component 1532 includes six switches 1602, 1604, 1606, 1608, 1636 and 1638, two capacitors 1670 and 1672, and three operational amplifiers 1674, 1676 and 1678. Further, the voltage-change-rate detection component 1532 includes four resistors 1680, 1682, 1684 and 1686, and a comparator 1688. For example, the resistances of the resistors 1680 and 1682 are equal, and the resistances of the resistors 1684 and 1686 are equal. In another example, the switches 1606 and 1636 are opened simultaneously and are closed simultaneously, and the switches 1608 and 1638 are opened simultaneously and are closed simultaneously.

In one embodiment, during a first switching period, in response to a sampling signal at the switch 1602, the feedback signal 1455 is sampled and held at the capacitor 1670, and a sampled/held feedback signal 1690 is generated. In one example, during a second switching period, in response to another sampling signal at the switch 1604, the feedback signal 1455 is sampled and held at the capacitor 1672, and a sampled/held feedback signal 1692 is generated. In another example, the second switching period follows immediately the first switching period.

According to another embodiment, the sampled/held feedback signals 1690 and 1692 are buffered by the operational amplifiers 1674 and 1676, respectively. For example, the operational amplifiers 1674 and 1676 generate buffered feedback signals 1634 and 1635, respectively. In another example, when the switches 1606 and 1636 are open, and the switches 1608 and 1638 are closed, the buffered feedback signals 1634 and 1635 pass through the switches 1606 and 1636, respectively. In yet another example, when the switches 1606 and 1636 are closed, and the switches 1608 and 1638 are open, the buffered feedback signals 1634 and 1635 pass through the switches 1608 and 1638, respectively. In yet another example, the buffered feedback signals 1634 and 1635 are equal in magnitude to the sampled/held feedback signals 1690 and 1692, respectively.

According to yet another embodiment, the resistors 1680 and 1682 receive the buffered feedback signals 1634 and 1635, and generate signals 1694 and 1696, respectively. For example, the signals 1694 and 1696 are compared at the operational amplifier 1678 which generates in response an amplified signal 1644. In another example, the amplified signal 1644 can be determined as follows:

$$V_o = \frac{R_4}{R_3} \times (V_{FB}(n-1) - V_{FB}(n)) \quad \text{(Equation 12)}$$

where $V_o$ represents the amplified signal 1644, $V_{FB}(n-1)$ represents the buffered feedback signal 1634, and $V_{FB}(n)$ represents the buffered feedback signal 1635. $R_3$ and $R_3'$ represent the resistances of the resistors 1680 and 1682 respectively, and $R_4$ and $R_4'$ represent the resistances of the resistors 1684 and 1686 respectively. For example, $R_3$ is equal to $R_3'$, and $R_4$ is equal to $R_4'$.

According to yet another embodiment, the amplified signal 1644 is compared with a threshold voltage 1646 (e.g., $V_{th\_3}$) at the comparator 1688. For example, the comparator 1688 provides in response the output signal 1550 to the dynamic-enhancement logic-control component 1534. In another example, if the amplified signal 1644 is greater than the threshold voltage 1646 which means the output voltage is dropping rapidly, the dynamic-enhancement logic-control component 1534 outputs signals for increasing the switching frequency and the peak current of the primary winding. In yet another example, the threshold voltage 1646 (e.g., $V_{th\_3}$) is proportional in magnitude to the first threshold voltage (e.g., $V_{th1}$) in the process 1210 as follows:

$$V_{th\_3} = V_{th1} \times \frac{R_4}{R_3} \quad \text{(Equation 13)}$$

where $V_{th\_3}$ represents the threshold voltage 1646, and $V_{th1}$ represents the first threshold voltage in the process 1210. Additionally, $R_3$ and $R_3'$ represent the resistances of the resistors 1680 and 1682 respectively, and $R_4$ and $R_4'$ represent the resistances of the resistors 1684 and 1686 respectively. For example, $R_3$ is equal to $R_3'$, and $R_4$ is equal to $R_4'$.

FIG. 15 is a simplified timing diagram for the switch-mode power conversion system 1100 as shown in FIG. 14 according to yet another embodiment of the present invention. This diagram is merely an example, which should not unduly limit the scope of the claims. One of ordinary skill in the art would recognize many variations, alternatives, and modifications.

As shown in FIG. 15, the waveform 1802 represents the turned-on and turned-off conditions of the switch 1420 as a function of time, the waveform 1804 represents a first sampling signal for the switch 1602 as a function of time, and the waveform 1806 represents a second sampling signal for the switch 1604 as a function of time. Additionally, the waveform 1808 represents a first control signal for the switches 1606 and 1636 as a function of time, and the waveform 1810 represents a second control signal for the switches 1608 and 1638 as a function of time. Different switching periods of the switch 1420 are shown in FIG. 15, such as time periods $T_H$, $T_I$, and $T_J$. For example, $T_H$, $T_I$, and $T_J$ are three consecutive switching periods. In another example, the times $t_7$ and $t_8$ are within the time period $T_H$, the time $t_9$ is within the time period $T_I$, and the time $t_{10}$ is within the time period $T_J$. In yet another example, $t_7 \leq t_8 \leq t_9 \leq t_{10}$.

According to one embodiment, during the time period $T_H$, the switch 1420 is open (e.g., being turned off) at the time $t_7$ (e.g., as shown by a falling edge of the waveform 1802), and the demagnetization process starts. For example, before $t_8$, the first sampling signal is at a logic low level before the time $t_8$ (e.g., as shown by the waveform 1804), and hence the switch 1602 is open (e.g., being turned off). In yet another example, when the demagnetization process almost ends at the time $t_8$, the first sampling signal changes from the logic low level to a logic high level (e.g., as shown by a rising edge in the waveform 1804). Hence, the switch 1602 is closed (e.g., being turned on), and in turn, the feedback signal 1455 is sampled and held at the capacitor 1670 according to certain embodiments. In yet another example, the sampled/held signal 1690 is generated to be provided to the operational amplifier 1674.

According to another embodiment, during the time period $T_f$, the switch 1604 is used to sample the feedback signal 1455. For example, before the time $t_9$, the second sampling signal provided to the switch 1604 is at the logic low level (e.g., as shown by the waveform 1806), and hence the switch 1604 is open (e.g., being turned off). In another example, at the time $t_9$, the second sampling signal changes from the logic low level to the logic high level (e.g., as shown by a rising edge of the waveform 1806). Hence, the switch 1604 is on (e.g., closed), and in turn, the feedback signal 1455 is sampled and held at the capacitor 1672 according to certain embodiments. In yet another example, the sampled/held signal 1692 is generated to be provided to the operational amplifier 1676.

According to yet another embodiment, during the time period $T_f$, the switches 1606 and 1636 are used to pass the buffered feedback signals 1634 and 1635 respectively, to the operational amplifier 1678. For example, the buffered feedback signals 1634 and 1635 are generated based on the sampled/held signals 1690 and 1692, respectively. In another example, before the time $t_9$, the first control signal for the switches 1606 and 1636 is at the logic low level (e.g., as shown by the waveform 1808), and the second control signal for the switches 1608 and 1638 is at the logic high level (e.g., as shown by the waveform 1810). Hence, the switches 1606 and 1636 are open (e.g., being turned off), and the switches 1608 and 1638 are closed (e.g., being turned on) according to certain embodiments.

In yet another example, at the time $t_9$, the first control signal changes from the logic low level to the logic high level (e.g., as shown by a rising edge in the waveform 1808). Hence, the switches 1606 and 1636 are closed (e.g., being turned on) according to certain embodiments. In yet another example, at the time $t_9$, the second control signal changes from the logic high level to the logic low level (e.g., as shown by a falling edge in the waveform 1810). Hence, the switches 1608 and 1638 are open (e.g., being turned off) according to certain embodiments. In yet another example, the buffered feedback signals 1634 and 1635 generated from the operational amplifiers 1674 and 1676 pass through the switches 1606 and 1636, respectively.

In another embodiment, during the time period $T_f$, the first sampling signal is at the logic low level before $t_{10}$, and changes from the logic low level to the logic high level at $t_{10}$. Hence, the switch 1602 is closed (e.g., being turned on) at $t_{10}$ according to certain embodiments. For example, the feedback signal 1455 is sampled and held at the capacitor 1670, and a new sampled/held feedback signal 1698 is generated to be provided to the operational amplifier 1674. In another example, the sampled/held feedback signal 1698 is buffered by the operational amplifier 1674 which generates a new buffered feedback signal 1699.

In yet another embodiment, during the time period $T_f$, the switches 1606 and 1636 are used to pass the buffered feedback signals 1699 and 1635 respectively, to the operational amplifier 1678. For example, before the time $t_{10}$, the second control signal for the switches 1608 and 1638 is at the logic low level (e.g., as shown by the waveform 1810), and the first control signal for the switches 1606 and 1636 is at the logic high level (e.g., as shown by the waveform 1808). Hence, the switches 1608 and 1638 are open (e.g., being turned off), and the switches 1606 and 1636 are closed (e.g., being turned on) according to certain embodiments.

In another example, at the time $t_{10}$, the second control signal changes from the logic low level to the logic high level (e.g., as shown by a rising edge in the waveform 1810). Hence, the switches 1608 and 1638 are closed (e.g., being turned on) according to certain embodiments. In yet another example, at the time $t_{10}$, the first control signal changes from the logic high level to the logic low level (e.g., as shown by a falling edge in the waveform 1808). Hence, the switches 1606 and 1636 are open (e.g., being turned off) according to certain embodiments. In yet another example, the buffered feedback signals 1699 and 1635 generated from the operational amplifiers 1674 and 1676 pass through the switches 1608 and 1638 respectively.

FIG. 16 is a simplified diagram showing certain components of the power conversion system 1100 according to yet another embodiment of the present invention. This diagram is merely an example, which should not unduly limit the scope of the claims. One of ordinary skill in the art would recognize many variations, alternatives, and modifications.

The power conversion system 1100 includes the resistors 1450 and 1452 on the auxiliary side. Additionally, the power conversion system 1100 includes the sampling switch 1502, the capacitor 1504, the buffer 1506, the error amplifier 1508, the exponential generator 1510, the demagnetization detector 1512, the oscillator 1514, the comparator 1516, the flip-flop component 1518, the gate driver 1520, the cable drop compensation component 1522, the logic component 1524, the comparators 1526, 1528, and 1530, the voltage-change-rate detection component 1532, the dynamic-enhancement logic-control component 1534, the resistors 1536 and 1538, the capacitor 1540, the NOT gate 1594, the NAND gate 1590, and the AND gate 1598.

The voltage-change-rate detection component 1532 includes two switches 1850 and 1852, two capacitors 1854 and 1856, a threshold level shift component 1858, a comparator 1860, a D flip-flop component 1862, and a sample delay component 1864.

In one embodiment, during a first switching period, a first sampling signal 1866 is provided to the sample delay component 1864. For example, the sample delay component 1864 generates in response a delayed sampling signal 1868. In another example, the switch 1852 is closed (e.g., being turned on) in response to the delayed sampling signal 1868. Hence, the feedback signal 1455 is sampled and held at the capacitor 1856 for the first switching period according to certain embodiments. In another example, a sampled/held signal 1880 is generated. In yet another example, the threshold level shift component 1858 receives the sampled/held signal 1880, and generates an output signal 1870 to be provided to the comparator 1860. In yet another example, the output signal 1870 is equal in magnitude to the delayed sampling signal 1868 subtracted by a threshold voltage (e.g., $V_{th4}$). In yet another example, the threshold voltage (e.g., $V_{th4}$) is larger than or equal to zero.

In another embodiment, during a second switching period, a second sampling signal 1882 is provided to the switch

1850. For example, in response, the switch 1850 is closed (e.g., being turned on). Hence, the feedback signal 1455 is sampled and held at the capacitor 1854 according to certain embodiments. In another example, a sampled/held signal 1872 is generated to be provided to the comparator 1860. In another example, the sampled/held signal 1872 is compared with the output signal 1870 at the comparator 1860. In yet another example, based on the comparison, the comparator 1860 provides a signal 1874 to the D flip-flop component 1862 that also receives the third sampling signal 1878 and a gate signal 1876. In yet another example, the D flip-flop component 1862 outputs the signal 1550 or one sub-signal of the signal 1550 to the dynamic-enhancement logic-control component 1534. In yet another example, if the output signal 1870 is greater in magnitude than the sampled/held feedback signal 1872 which means the output voltage is dropping rapidly, the dynamic-enhancement logic-control component 1534 outputs signals for adjusting the switching frequency and the peak current of the primary winding.

For example, the first sampling signal 1866, the second sampling signal 1882, and the delayed sampling signal 1868 include pulse signals. In another example, the sampled/held signal 1872 is compared with the output signal 1870 at a falling edge of a pulse signal of the second sampling signal 1882. In yet another example, the second switching period follows immediately the first switching period. In yet another example, the threshold voltage $V_{th4}$ is equal in magnitude to the first threshold voltage (e.g., $V_{th1}$) in the process 1210. In yet another example, the threshold voltage $V_{th4}$ is proportional in magnitude to the threshold voltage 1646 (e.g., $V_{th\_3}$).

In yet another embodiment, during the second switching period, the second sampling signal 1882 is provided to the sample delay component 1864. For example, the sample delay component 1864 generates in response a new delayed sampling signal. In another example, the switch 1852 is closed (e.g., being turned on) in response to the new delayed sampling signal. Hence, the feedback signal 1455 is sampled and held at the capacitor 1856 for the second switching period according to certain embodiments. In another example, a new sampled/held signal is generated to be provided to the threshold level shift component 1858. In yet another example, the threshold level shift component 1858 generates in response a new output signal to be provided to the comparator 1860. In yet another example, the comparator 1860 compares the new output signal from the threshold level shift component 1858 with another sampled/held signal generated by the capacitor 1854 during a third switching period. In yet another example, the third switching period follows immediately the second switching period.

FIG. 17 is a simplified timing diagram for the switch-mode power conversion system 1100 as shown in FIG. 16 according to yet another embodiment of the present invention. This diagram is merely an example, which should not unduly limit the scope of the claims. One of ordinary skill in the art would recognize many variations, alternatives, and modifications.

As shown in FIG. 17, the waveform 2002 represents the turned-on and turned-off conditions of the switch 1420 as a function of time, and the waveform 2004 represents the feedback signal 1455 as a function of time. The waveform 2006 represents a third sampling signal for the switch 1850 as a function of time, and the waveform 2008 represents a fourth sampling signal for the switch 1852 as a function of time. Different switching periods of the switch 1420 are shown in FIG. 17. For example, an entire switching period $T_L$ and a part of a switching period $T_M$ of the switch 1420 are shown. In another example, $T_L$ and $T_M$ are two consecutive switching periods. In yet another example, the times $t_{11}$, $t_{12}$, $t_{13}$, and $t_{14}$ are within the time period $T_L$, and the times $t_{15}$ and $t_{16}$ are within the time period $T_M$. In yet another example, $t_{11} \leq t_{12} \leq t_{13} \leq t_{14} \leq t_{15} \leq t_{16}$.

According to one embodiment, during the time period $T_L$, the switch 1420 is open (e.g., being turned off) at the time $t_{11}$ (e.g., as shown by a falling edge of the waveform 2002), and the demagnetization process starts (e.g., as shown by the waveform 2004). For example, the third sampling signal is at the logic low level before the time $t_{12}$ (e.g., as shown by the waveform 2006), and hence the switch 1850 is open (e.g., being turned off). In another example, at the time $t_{12}$, the third sampling signal changes from the logic low level to the logic high level (e.g., as shown by a rising edge in the waveform 2006). Hence, the switch 1850 is closed (e.g., being turned on) according to certain embodiments. In yet another example, the feedback signal 1455 is sampled and held at the capacitor 1854 for the time period $T_L$. In yet another example, the third sampling signal changes from the logic high level to the logic low level at the time $t_{13}$ (e.g., as shown by the falling edge of the waveform 2006). Hence, the switch 1850 is open (e.g., being turned off) according to certain embodiments.

According to another embodiment, during the time period $T_L$, the fourth sampling signal is at the logic low level before the time $t_{14}$ (e.g., as shown by the waveform 2008). For example, the switch 1852 is open (e.g., being turned off). In another example, at the time $t_{14}$, the fourth sampling signal changes from the logic low level to the logic high level (e.g., as shown by a rising edge in the waveform 2008). Hence, the switch 1852 is closed (e.g., being turned on), and in turn, the feedback signal 1455 is sampled and held at the capacitor 1856 according to certain embodiments. In yet another example, the difference between $t_{13}$ and $t_{14}$ is a predetermined time period $T_d$. In yet another example, the magnitude of the feedback signal 1455 at $t_{13}$ is approximately equal to the magnitude of the feedback signal 1455 at $t_{14}$.

According to yet another embodiment, during the time period $T_M$, the third sampling signal changes from the logic low level to the logic high level at the time $t_{15}$ (e.g., as shown by a rising edge in the waveform 2006). Hence, the switch 1850 is closed (e.g., being turned on), and in turn, the feedback signal 1455 is sampled and held at the capacitor 1854 according to certain embodiments. In another example, the sampled/held signal 1872 is generated to be provided to the comparator 1860. In yet another example, the third sampling signal changes from the logic high level to the logic low level at the time $t_{16}$ (e.g., as shown by a falling edge of the waveform 2006). In yet another example, at the time $t_{16}$, the output signal 1870 generated by the threshold level shift component 1858 is compared with the sampled/held feedback signal 1872 at the comparator 1860.

According to another embodiment, a system for regulating a power converter includes a first comparator, a pulse-width-modulation generator, a driver component, and a voltage-change-rate detection component. The first comparator is configured to receive a first input signal and a second input signal and generate a first comparison signal based on at least information associated with the first input signal and the second input signal, the first input signal being associated with at least a feedback signal related to an output current of the power converter. The pulse-width-modulation generator is configured to receive at least the first comparison signal and generate a modulation signal based on at least information associated with the first comparison signal, the modulation signal being associated with a modulation frequency. Moreover, the driver component is configured to receive the modulation signal and output a drive signal to a switch to adjust a primary current flowing through a primary winding of the power converter, the primary current being associated with a peak magnitude for each modulation period corresponding to the modulation frequency. Additionally, the voltage-change-rate detection component is configured to sample the feedback signal to generate a first sampled signal for a first modulation period and to sample the feedback signal to generate a second sampled signal for a second modulation period, the voltage-change-rate detection component being further configured to compare the first sampled signal and the second sampled signal in magnitude, the second modulation period being after the first modulation period. The system is further configured to determine whether the first sampled signal subtracted by the second sampled signal satisfies one or more first conditions. If the one or more first conditions are satisfied, the system is further configured to increase the modulation frequency and the peak magnitude related to the primary current. For example, the system is implemented according to at least FIG. 11, FIG. 12, FIG. 13, FIG. 14, FIG. 15, FIG. 16, and/or FIG. 17.

According to another embodiment, a method for regulating a power converter includes receiving a first input signal and a second input signal, processing information associated with the first input signal and the second input signal, and generating a first comparison signal based on at least information associated with the first input signal and the second input signal, the first input signal being associated with at least a feedback signal related to an output current of the power converter. The method further includes receiving at least the first comparison signal, processing information associated with the first comparison signal, and generating a modulation signal based on at least information associated with the first comparison signal, the modulation signal being associated with a modulation frequency. In addition, the method includes receiving the modulation signal, processing information associated with the modulation signal, and outputting a drive signal to a switch to adjust a primary current flowing through a primary winding of the power converter, the primary current being associated with a peak magnitude for each modulation period corresponding to the modulation frequency. Moreover, the method includes sampling the feedback signal to generate a first sampled signal for a first modulation period, and sampling the feedback signal to generate a second sampled signal for a second modulation period, the second modulation period being after the first modulation period. Furthermore, the method includes determining whether the first sampled signal subtracted by the second sampled signal satisfies one or more first conditions, and if the one or more first conditions are satisfied, increasing the modulation frequency and the peak magnitude related to the primary current. For example, the method is implemented according to at least FIG. 11, FIG. 12, FIG. 13, FIG. 14, FIG. 15, FIG. 16, and/or FIG. 17.

According to yet another embodiment, a system for regulating a power converter includes a first comparator, a pulse-width-modulation generator, a driver component, and a voltage-change-rate detection component. The first comparator is configured to receive a first input signal and a second input signal and generate a first comparison signal based on at least information associated with the first input signal and the second input signal, the first input signal being associated with at least a feedback signal related to an output current of the power converter. The pulse-width-modulation generator is configured to receive at least the first comparison signal and generate a modulation signal based on at least information associated with the first comparison signal, the modulation signal being associated with a modulation frequency. Moreover, the driver component is configured to receive the modulation signal and output a drive signal to a switch to adjust a primary current flowing through a primary winding of the power converter, the primary current being associated with a peak magnitude for each modulation period corresponding to the modulation frequency. In addition, the voltage-change-rate detection component is configured to sample the feedback signal to generate a first sampled signal for a first modulation period and to sample the feedback signal to generate a second sampled signal for a second modulation period, the voltage-change-rate detection component being further configured to compare the first sampled signal and the second sampled signal in magnitude, the second modulation period being after the first modulation period. The system is further configured to determine whether the first sampled signal subtracted by the second sampled signal is larger than a first threshold voltage, the first threshold voltage being larger than or equal to zero, and if the first sampled signal subtracted by the second sampled signal is determined to be larger than the first threshold voltage, increase the modulation frequency and the peak magnitude related to the primary current. Furthermore, the system is further configured to determine whether the second sampled signal subtracted by the first sampled signal is larger than a second threshold voltage, the second threshold voltage being larger than or equal to zero; and if the second sampled signal subtracted by the first sampled signal is determined to be larger than the second threshold voltage, decrease the modulation frequency and the peak magnitude related to the primary current. For example, the system is implemented according to at least FIG. 11, FIG. 12, FIG. 13, FIG. 14, FIG. 15, FIG. 16, and/or FIG. 17.

According to yet another embodiment, a method for regulating a power converter includes receiving a first input signal and a second input signal, processing information associated with the first input signal and the second input signal, and generating a first comparison signal based on at least information associated with the first input signal and the second input signal, the first input signal being associated with at least a feedback signal related to an output current of the power converter. The method further includes receiving at least the first comparison signal, processing information associated with the first comparison signal, and generating a modulation signal based on at least information associated with the first comparison signal, the modulation signal being associated with a modulation frequency. In addition, the method includes receiving the modulation signal, processing information associated with the modulation signal, and outputting a drive signal to a switch to adjust a primary current flowing through a primary winding of the power converter, the primary current being associated with a peak magnitude for each modulation period corresponding to the modulation frequency. Moreover, the method includes sampling the feedback signal to generate a first sampled signal for a first modulation period, sampling the feedback signal to generate a second sampled signal for a second modulation period, the second modulation period being after the first modulation period. Furthermore, the method includes determining whether the first sampled signal subtracted by the second sampled signal is larger than a first threshold voltage, the first threshold voltage being larger than or equal to zero, and if the first sampled signal subtracted by the second sampled signal is determined to be larger than the first threshold voltage, increasing the modulation frequency and the peak magnitude related to the primary current. Additionally, the method includes determining whether the second sampled signal subtracted by the first sampled signal is larger than a second threshold voltage, the second threshold voltage being larger than or equal to zero, and if the second sampled signal subtracted by the first sampled signal is determined to be larger than the second threshold voltage, decreasing the modulation frequency and the peak magnitude related to the primary current. For example, the method is implemented according to at least FIG. 11, FIG. 12, FIG. 13, FIG. 14, FIG. 15, FIG. 16, and/or FIG. 17.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for a power converter, the system comprising:
a pulse-width-modulation generator configured to receive at least a first comparison signal associated with at least a feedback signal related to an output current of the power converter and generate a modulation signal based at least in part on the first comparison signal, the modulation signal being associated with a modulation frequency;
a driver component configured to receive the modulation signal and output a drive signal to a switch to adjust a first current flowing through a primary winding of the power converter, the first current being associated with a peak magnitude for each modulation period corresponding to the modulation frequency; and
a detection component configured to sample the feedback signal to generate a first sampled signal for a first modulation period and to sample the feedback signal to generate a second sampled signal for a second modulation period, the detection component being further configured to receive the first sampled signal and the second sampled signal in magnitude, the second modulation period being after the first modulation period;
wherein the system for the power converter is further configured to:
determine whether the first sampled signal subtracted by the second sampled signal satisfies one or more first conditions; and
in response to the one or more first conditions being satisfied, increase the modulation frequency and the peak magnitude related to the first current.

2. The system of claim 1 is further configured to determine that the first sampled signal subtracted by the second sampled signal satisfies the one or more first conditions in response to the first sampled signal subtracted by the second sampled signal being larger than a first threshold voltage, the first threshold voltage being larger than or equal to zero.

3. The system of claim 1 is further configured to:
determine whether the second sampled signal subtracted by the first sampled signal satisfies one or more second conditions; and
in response to the one or more second conditions being satisfied, decrease the modulation frequency and the peak magnitude related to the first current.

4. The system of claim 3 is further configured to determine that the second sampled signal subtracted by the first sampled signal satisfies the one or more second conditions in response to the second sampled signal subtracted by the first sampled signal being larger than a second threshold voltage, the second threshold voltage being larger than or equal to zero.

5. The system of claim 3 and further comprising:
an exponential generator configured to generate a first input signal associated with the first comparison signal; and
a dynamic control component coupled to the detection component and configured to generate at least a second input signal and a third input signal;
wherein the exponential generator is further configured to receive at least the second input signal and in response change the first input signal in order to increase or decrease the modulation frequency.

6. The system of claim 5 and further comprising a logic control component configured to receive at least the third input signal and in response change a logic signal in order to increase or decrease the peak magnitude related to the first current.

7. The system of claim 6 wherein the pulse-width-modulation generator is further configured to receive the logic signal and generate the modulation signal based on at least information associated with the first comparison signal and the logic signal.

8. The system of claim 1 wherein the second modulation period is immediately after the first modulation period.

9. The system of claim 1 and further comprising a first comparator configured to receive a first input signal and a second input signal and generate a second comparison signal based at least in part on the first input signal and the second input signal, the second input signal being associated with the first current flowing through the primary winding of the power converter.

10. The system of claim 9 and further comprising:
a second comparator configured to receive the second input signal and a first threshold signal and generate a third comparison signal based on at least information associated with the second input signal and the first threshold signal; and
a third comparator configured to receive the second input signal and a second threshold signal and generate a fourth comparison signal based on at least information associated with the second input signal and the second threshold signal.

11. The system of claim 1 wherein the pulse-width-modulation generator includes:
a NAND gate configured to receive at least the first comparison signal;
an AND gate coupled to the NAND gate; and
a flip-flop component coupled to the AND gate and a logic control component and configured to generate the modulation signal.

12. The system of claim 1 wherein the switch is a bipolar transistor.

13. The system of claim 1 wherein the switch is a MOS transistor.

14. The system of claim 1 and further comprising a current generator configured to receive the first comparison signal and output a compensation current based on at least information associated with the first comparison signal to generate a compensation voltage and adjust a first input signal associated with the first comparison signal.

15. The system of claim 1 wherein the detection component includes:
a first sample and hold circuit configured to sample the feedback signal to generate the first sampled signal for the first modulation period;
a second sample and hold circuit configured to sample the feedback signal to generate the second sampled signal for the second modulation period;
an operational amplifier configured to receive a first input signal and a second input signal and to generate a first output signal, the first input signal being proportional in magnitude to the first sampled signal, the second input signal being proportional in magnitude to the second sampled signal, the first output signal associated with the first sampled signal subtracted by the second sampled signal; and
a comparator configured to receive the first output signal and a threshold voltage and to generate a second comparison signal based at least in part on the first output signal and the threshold voltage.

16. The system of claim 15 and further comprising:
a dynamic control component configured to receive at least the second comparison signal and generate at least a second output signal; and
a logic control component configured to receive at least the second output signal and in response change a logic signal in order to increase or decrease the peak magnitude related to the first current;
wherein the pulse-width-modulation generator is further configured to receive the logic signal and generate the modulation signal based on at least information associated with the first comparison signal and the logic signal.

17. The system of claim 16 is further configured to determine that the first sampled signal subtracted by the second sampled signal satisfies the one or more first conditions in response to the first output signal being larger than the threshold voltage, the threshold voltage being larger than or equal to zero.

18. The system of claim 1 wherein the detection component includes:
a first sample and hold circuit configured to sample the feedback signal to generate the first sampled signal for the first modulation period;
a second sample and hold circuit configured to sample the feedback signal to generate the second sampled signal for the second modulation period;
a voltage level shift component configured to receive the first sampled signal and to generate a first output signal, the first output signal being equal in magnitude to the first sampled signal subtracted by a threshold voltage; and
a second comparator configured to receive the first output signal and the second sampled signal and to generate a second comparison signal.

19. The system of claim 18 and further comprising:
a dynamic control component configured to receive at least the second comparison signal and generate at least a second output signal; and
a logic control component configured to receive at least the second output signal and in response change a logic signal in order to increase or decrease the peak magnitude related to the first current;
wherein the pulse-width-modulation generator is further configured to receive the logic signal and generate the modulation signal based on at least information associated with the first comparison signal and the logic signal.

20. The system of claim 19 is further configured to determine that the first sampled signal subtracted by the second sampled signal satisfies the one or more first conditions in response to the first output signal being larger than the second sampled signal, the threshold voltage being larger than or equal to zero.

21. A method for a power converter, the method comprising:
receiving at least a comparison signal associated with at least a feedback signal related to an output current of the power converter;
processing information associated with the comparison signal;
generating a modulation signal based at least in part on the comparison signal, the modulation signal being associated with a modulation frequency;
receiving the modulation signal;
processing information associated with the modulation signal;
outputting a drive signal to a switch to adjust a first current flowing through a primary winding of the power converter, the first current being associated with a peak magnitude for each modulation period corresponding to the modulation frequency;
sampling the feedback signal to generate a first sampled signal for a first modulation period;
sampling the feedback signal to generate a second sampled signal for a second modulation period, the second modulation period being after the first modulation period;
determining whether the first sampled signal subtracted by the second sampled signal satisfies one or more first conditions; and
in response to the one or more first conditions are satisfied, increasing the modulation frequency and the peak magnitude related to the first current.

22. The method of claim 21 and further comprising:
determining whether the second sampled signal subtracted by the first sampled signal satisfies one or more second conditions; and
in response to the one or more second conditions being satisfied, decreasing the modulation frequency and the peak magnitude related to the first current.

23. A system for a power converter, the system comprising:
a pulse-width-modulation generator configured to receive at least a comparison signal associated with at least a feedback signal related to an output current of the power converter and generate a modulation signal based at least in part on the comparison signal, the modulation signal being associated with a modulation frequency;
a driver component configured to receive the modulation signal and output a drive signal to a switch to adjust a first current flowing through a primary winding of the power converter, the first current being associated with a peak magnitude for each modulation period corresponding to the modulation frequency; and a detection component configured to sample the feedback signal to generate a first sampled signal for a first modulation period and to sample the feedback signal to generate a second sampled signal for a second modulation period, the detection component being further configured to receive the first sampled signal and the second sampled signal in magnitude, the second modulation period being after the first modulation period;

wherein the system for regulating the power converter is further configured to:

determine whether the first sampled signal subtracted by the second sampled signal is larger than a first threshold, the first threshold being larger than or equal to zero;

in response to the first sampled signal subtracted by the second sampled signal being determined to be larger than the first threshold, increase the modulation frequency and the peak magnitude related to the first current;

determine whether the second sampled signal subtracted by the first sampled signal is larger than a second threshold, the second threshold being larger than or equal to zero; and in response to the second sampled signal subtracted by the first sampled signal being determined to be larger than the second threshold, decrease the modulation frequency and the peak magnitude related to the first current.

24. The system of claim 23 is further configured to:

in response to the first sampled signal subtracted by the second sampled signal being determined to be larger than the first threshold, increase the modulation frequency to a predetermined first frequency and increase the peak magnitude to a predetermined first magnitude; and in response to the second sampled signal subtracted by the first sampled signal being determined to be larger than the second threshold, decrease the modulation frequency to a predetermined second frequency and decrease the peak magnitude to a predetermined second magnitude.

25. A method for a power converter, the method comprising:

generating a comparison signal associated with at least a feedback signal related to an output current of the power converter;

receiving at least the comparison signal;

processing information associated with the comparison signal;

generating a modulation signal based at least in part on the comparison signal, the modulation signal being associated with a modulation frequency;

receiving the modulation signal;

processing information associated with the modulation signal;

outputting a drive signal to a switch to adjust a first current flowing through a primary winding of the power converter, the first current being associated with a peak magnitude for each modulation period corresponding to the modulation frequency;

sampling the feedback signal to generate a first sampled signal for a first modulation period;

sampling the feedback signal to generate a second sampled signal for a second modulation period, the second modulation period being after the first modulation period;

determining whether the first sampled signal subtracted by the second sampled signal is larger than a first threshold, the first threshold being larger than or equal to zero;

in response to the first sampled signal subtracted by the second sampled signal being determined to be larger than the first threshold, increasing the modulation frequency and the peak magnitude related to the first current;

determining whether the second sampled signal subtracted by the first sampled signal is larger than a second threshold, the second threshold being larger than or equal to zero; and in response to the second sampled signal subtracted by the first sampled signal being determined to be larger than the second threshold, decreasing the modulation frequency and the peak magnitude related to the first current.

* * * * *